(12) United States Patent
Nimbalker et al.

(10) Patent No.: US 11,979,755 B2
(45) Date of Patent: May 7, 2024

(54) METHODS AND APPARATUS FOR CONTROLLING AND CONFIGURING CROSS-CARRIER SCHEDULING

(71) Applicant: Telefonaktiebolaget LM Ericsson (publ), Stockholm (SE)

(72) Inventors: Ajit Nimbalker, Fremont, CA (US); Ravikiran Nory, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 371 days.

(21) Appl. No.: 17/608,674

(22) PCT Filed: May 2, 2020

(86) PCT No.: PCT/EP2020/062226
§ 371 (c)(1),
(2) Date: Nov. 3, 2021

(87) PCT Pub. No.: WO2020/225166
PCT Pub. Date: Nov. 12, 2020

(65) Prior Publication Data
US 2022/0224487 A1    Jul. 14, 2022

Related U.S. Application Data

(60) Provisional application No. 62/843,262, filed on May 3, 2019.

(51) Int. Cl.
*H04W 24/02* (2009.01)
*H04L 5/00* (2006.01)
(Continued)

(52) U.S. Cl.
CPC .............. *H04W 24/02* (2013.01); *H04L 5/001* (2013.01); *H04W 8/22* (2013.01); *H04W 72/20* (2023.01);
(Continued)

(58) Field of Classification Search
CPC ....... H04W 24/02; H04W 8/22; H04W 72/20; H04L 5/001
See application file for complete search history.

(56) References Cited

U.S. PATENT DOCUMENTS

2019/0306850 A1* 10/2019 Zhang .................. H04B 7/0626
2019/0313429 A1* 10/2019 Cheng .................. H04W 76/27

OTHER PUBLICATIONS

NTT DOCOMO, Inc., "Discussion on CORESET0", 3GPP TSG RAN WG1 Meeting #95, Nov. 12-16, 2018, pp. 1-80, Spokane, US, R1-1813934.

(Continued)

*Primary Examiner* — Kevin C. Harper
(74) *Attorney, Agent, or Firm* — COATS & BENNETT, PLLC

(57) ABSTRACT

Methods and apparatus for controlling and configuring cross carrier scheduling are disclosed. In one example a method (100), performed by a wireless device (10, 30) is disclosed. The wireless device (10, 30) is configured for cross-carrier scheduling in a wireless communication network. The method (100) comprises signalling (102) to the network an indication that the wireless device (10, 30) is capable of using a reference Transmission Configuration Indication, TCI, state for a cross-carrier scheduled Physical Downlink Shared Channel, PDSCH, reception on a second serving cell, with a scheduling offset from a Physical Downlink Control Channel, PDCCH, reception from a first serving cell that scheduled the PDSCH, that is less than a predetermined delay Delta_Offset. In response to signalling the reference TCI state capability the method further includes receiving (104) from the network an indication of a TCI state to use as the reference TCI state.

15 Claims, 16 Drawing Sheets

(51) Int. Cl.
*H04W 8/22* (2009.01)
*H04W 72/20* (2023.01)
*H04W 72/23* (2023.01)
*H04W 72/51* (2023.01)

(52) U.S. Cl.
CPC ........... *H04L 5/0053* (2013.01); *H04W 72/23* (2023.01); *H04W 72/51* (2023.01)

(56) References Cited

OTHER PUBLICATIONS

Ericsson, "Feature lead summary beam management", 3GPP TSG-RAN WG1 Meeting #94, Aug. 20-24, 2018, pp. 1-24, Gothenburg, Tdog R1-1809759.
Asustek, "Remaining issues on beam management", 3GPP TSG RAN WG1 Meeting #93, May 21-25, 2018, pp. 1-9, Busan, Korea, R1-1807210.

* cited by examiner

METHODS AND APPARATUS FOR CONTROLLING AND CONFIGURING CROSS-CARRIER SCHEDULING

TECHNICAL FIELD

The present invention relates generally to wireless communication networks, and in particular to systems and methods for controlling and configuring cross-carrier scheduling.

BACKGROUND

Wireless communication networks, enabling voice and data communications to wireless devices, are ubiquitous in many parts of the world, and continue to advance in technological sophistication, system capacity, data rates, bandwidth, supported services, and the like. A basic model of one type of wireless network, generally known as "cellular," features a plurality of generally fixed network nodes (known variously as base station, radio base station, base transceiver station, serving node, NodeB, eNobeB, eNB, gNB, and the like), each providing wireless communication service to a large plurality of wireless devices (known variously as mobile terminals, User Equipment or UE, and the like) within a generally fixed geographical area, known as a cell or sector.

The Radio Access Technology (RAT) for the 5th Generation (5G) wireless network technology being developed by the 3rd Generation Partnership Project (3GPP) is known as New Radio (NR). NR supports multiple antenna technologies (e.g., MIMO and beamforming), carrier aggregation (CA), and cross-carrier scheduling.

Symbols received on different antenna ports may be correlated, giving rise to a property call Quasi Co-Located (QCL). Two antenna ports are said to be quasi co-located if properties of the channel over which a symbol on one antenna port is conveyed can be inferred from the channel over which a symbol on the other antenna port is conveyed. See 3GPP TS 38.214 V15.5.0. The channel properties that may be correlated include Doppler shift, Doppler spread, average delay, delay spread, and spatial Rx parameter (for beamforming).

The QCL assumption for reception on the Physical Downlink Shared Channel (PDSCH) is typically based on an explicit field, known as Transmission Configuration Indication (TCI), in the corresponding Downlink Control Information (DCI) message. A UE may indicate, via UE capability signalling, a minimum scheduling offset threshold value (Delta_Offset) which is a minimum separation between the end of a scheduling Physical Downlink Control Channel (PDCCH) and the start of a corresponding PDSCH, for the UE to be able to receive the PDSCH according to the TCI state indicated in the PDCCH. If the minimum separation is smaller than Delta_Offset, a UE may be unable to receive PDSCH according to the TCI state indicated in the DCI. If TCI field is not present, then the TCI state for PDSCH reception can follow the TCI state for the Control Resource Set (CORESET) in which the corresponding PDCCH is received. The CORESET comprises physical resources and parameters defining a control region in NR—similar to the PDCCH area of Long Term Evolution (LTE) (i.e., the first 1-4 symbols in a subframe), but not spanning the entire channel bandwidth.

For cross-carrier scheduling, the PDCCH in a first component carrier (e.g., in FR1) can schedule a PDSCH in second component carrier (e.g., in FR2). Currently, the following behavior is supported, which means the UE expects the network to schedule PDSCH such that the minimum scheduling offset is always guaranteed.

When the UE is configured with a CORESET associated with a search space set for cross-carrier scheduling, the UE expects the parameter tci-PresentInDci is set as 'enabled' for the CORESET, and if one or more of the TCI states configured for the serving cell scheduled by the search space set contains 'QCL-TypeD', the UE expects the time offset between the reception of the detected PDCCH in the search space set and the corresponding PDSCH is larger than or equal to the threshold Threshold-Sched-Offset.

Thus, for cross-carrier scheduling, the behavior for PDSCH reception when the scheduling offset is smaller than the Delta_Offset is not specified. This may lead to increased delay in scheduling, since the network must ensure the scheduling offset is larger than Delta_Offset.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to certain embodiments described herein, the MAC Control Element (CE) used for "TCI state indication for UE-specific PDCCH MAC CE" is reused to indicate the TCI state used for PDSCH reception on a scheduled cell which is scheduled from another scheduling cell and when the scheduling offset between end of PDCCH reception on the scheduling cell and the beginning of the corresponding PDSCH reception on the scheduled cell is smaller than the Delta_Offset. Specifically, a UE configured with cross-carrier scheduling receives a MAC CE message, and if the serving cell indicated in that MAC CE message corresponds to a first serving cell which is a scheduling serving cell, the UE determines that a TCI state indicated in the MAC CE message is applicable to a control resource set (e.g., used for PDCCH reception) of the first serving cell; and if the serving cell indicated in that MAC CE message corresponds to a second serving cell which is not a scheduling serving cell, the UE determines that the TCI state indicated in the MAC CE message is applicable to a PDSCH received on the second serving cell.

One embodiment relates to a method, performed by a wireless device configured for cross-carrier scheduling in a wireless communication network. An indication is signalled to the network that the wireless device is capable of using a reference Transmission Configuration Indication (TCI) state for a cross-carrier scheduled Physical Downlink Shared Channel (PDSCH) reception from a second serving cell, with a scheduling offset from a Physical Downlink Control Channel (PDCCH) reception from a first serving cell that is less than a predeterminded delay Delta_Offset. In response to signalling the reference TCI state capability, an indication is received from the network of a TCI state to use as the reference TCI state.

Another embodiment relates to a wireless device configured to perform any of the steps described above.

Yet another embodiment relates to a method performed by a base station operative in a wireless communication network, of providing a reference TCI state indication to a cross-carrier scheduled wireless device. An indication is received from a wireless device that the wireless device is capable of using a reference Transmission Configuration Indication (TCI) state for a cross-carrier scheduled Physical Downlink Shared Channel (PDSCH) reception from a second serving cell, with a scheduling offset from a Physical Downlink Control Channel (PDCCH) reception from a first serving cell that is less than a predeterminded delay Delta_Offset. In response to receiving the reference TCI state capability, an indication is sent to the wireless device of a TCI state to use as the reference TCI state.

Still another embodiment relates to a method of obtaining user data; and forwarding the user data to a host computer or a wireless device.

Still another embodiment relates to a wireless device configured to perform any of the steps of the user equipment claims.

Still another embodiment relates to a user equipment (UE). The UE includes an antenna configured to send and receive wireless signals; radio front-end circuitry connected to the antenna and to processing circuitry, and configured to condition signals communicated between the antenna and the processing circuitry. The processing circuitry is configured to perform any of the steps described above. The UE further includes an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Still another embodiment relates to a computer program comprising instructions which, when executed by at least one processor of a wireless device, causes the wireless device to carry out the steps described above.

Still another embodiment relates to a carrier containing the computer program described above, wherein the carrier is one of an electronic signal, optical signal, radio signal, or computer readable storage medium.

Still another embodiment relates to a base station configured to perform any of the steps described above.

Still another embodiment relates to a base station including processing circuitry configured to perform any of the steps described above, and power supply circuitry configured to supply power to the wireless device.

Still another embodiment relates to a base station including processing circuitry and memory, the memory containing instructions executable by the processing circuitry whereby the base station is configured to perform any of the steps described above.

Still another embodiment relates to a computer program comprising instructions which, when executed by at least one processor of a base station, causes the base station to carry out the steps described above.

Still another embodiment relates to a carrier containing the computer program described above, wherein the carrier is one of an electronic signal, optical signal, radio signal, or computer readable storage medium.

Still another embodiment relates to a communication system including a host computer. The host computer includes processing circuitry configured to provide user data, and a communication interface configured to forward the user data to a cellular network for transmission to a UE, wherein processing circuitry in the UE is configured to perform any of the steps described above. The cellular network also includes a base station having a radio interface and processing circuitry.

Still another embodiment relates to a method implemented in a communication system including a host computer, a base station and a UE. At the host computer, user data is provided. At the host computer, a transmission carrying the user data to the UE is initiated via a cellular network comprising the base station, wherein the UE performs any of the steps described above.

Still another embodiment relates to a communication system including a host computer. The host computer includes processing circuitry configured to provide user data, and a communication interface configured to forward user data to a cellular network for transmission to a UE. The UE includes a radio interface and processing circuitry. The UE's components configured to perform any of the steps described above.

Still another embodiment relates to a method implemented in a communication system including a host computer, a base station, and a UE. At the host computer, user data is provided. At the host computer, a transmission carrying the user data to the UE is initiated via a cellular network comprising the base station. The UE performs any of the steps described above.

Still another embodiment relates to a communication system including a host computer. The host computer includes a communication interface configured to receive user data originating from a transmission from a UE to a base station. The UE includes a radio interface and processing circuitry. The UE's processing circuitry is configured to perform any of the steps described above.

Still another embodiment relates to a method implemented in a communication system including a host computer, a base station, and a UE. At the host computer, user data transmitted to the base station from the UE is received. The UE performs any of the steps described above.

Still another embodiment relates to a method implemented in a communication system including a host computer, a base station, and a UE. At the host computer, user data originating from a transmission which the base station has received from the UE is received from the base station. The UE performs any of the steps described above.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention. At least some of the exemplary embodiments may be described as applicable in certain contexts and/or wireless network types for illustrative purposes, but the embodiments are similarly applicable in other contexts and/or wireless network types not explicitly described.

Figure 1:
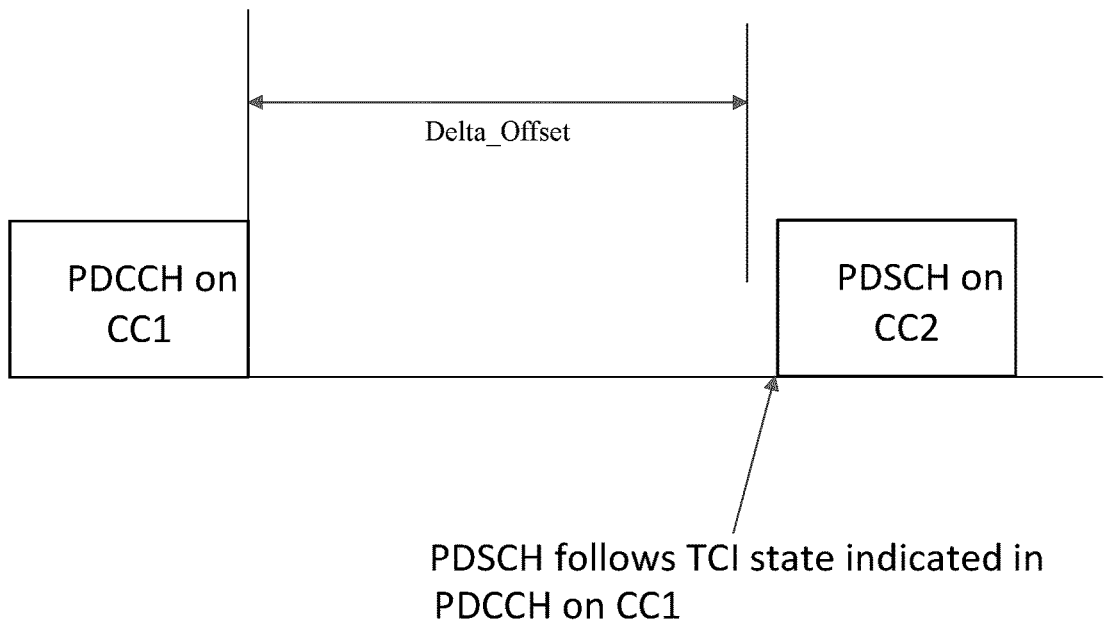
FIG. 1 is a time domain signalling diagram of a delay greater than a threshold.

FIG. 1 illustrates the case where a PDSCH transmission on CC2 follows the associated PDCCH transmission on CC1 by more than Delta_Offset. In this case, the UE's QCL assumption for the PDSCH received on CC2 follows the TCI state indicated in a DCI message in the PDCCH on CC1.

Figure 2:
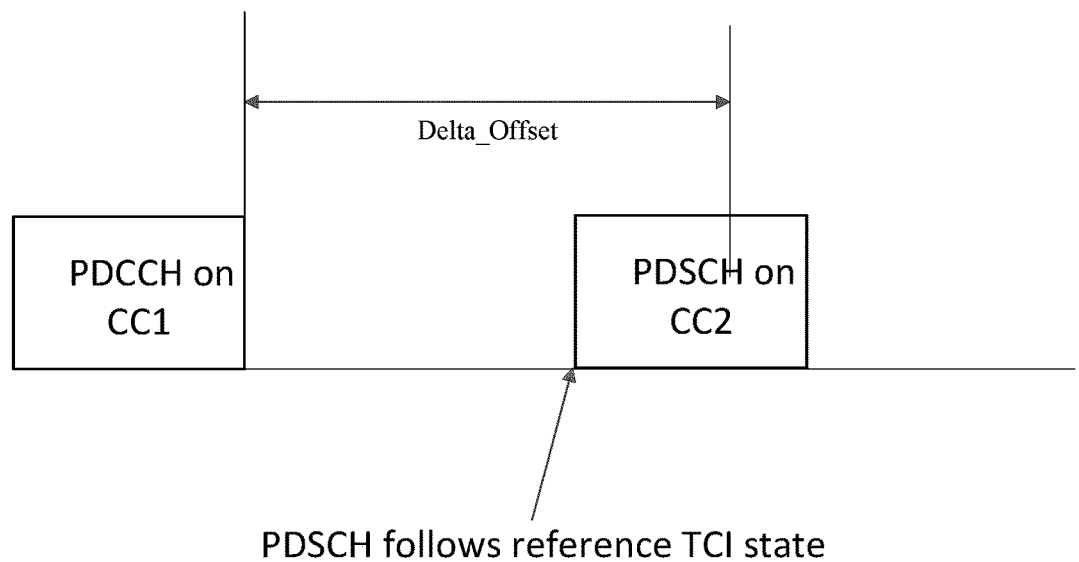
FIG. 2 is a time domain signalling diagram of a delay less than the threshold.

FIG. 2 illustrates a case of interest. In particular, the QCL assumption for PDSCH on CC2 scheduled by a PDCCH sent on CC1, where the scheduling offset is less than Delta_Offset, needs to be based on a reference TCI state. At least three alternative solutions to providing a reference TCI state have been considered, which allow PDSCH reception when the scheduling offset is smaller than the Delta_Offset.

A first alternative is that for cross-carrier scheduling, if the scheduling timing offset is smaller than the threshold, or if Tci-PresentInDCI is not enabled for DCI format 1_1, the default QCL assumption for PDSCH is based on the active TCI state with the lowest ID applicable to PDSCH in the active bandwidth part (BWP) of the scheduled cell. However, this proposed alternative is inflexible—in particular, it does not allow the gNB the flexibility to associate one of the active TCI states to be the reference TCI state.

A second alternative is that for cross-carrier scheduling, an explicit TCI-state is configured for a QCL assumption for PDSCH reception when the PDSCH scheduling timing offset is smaller than the Delta_Offset threshold. While this proposed alternative allows the gNB greater flexibility, it is slower than Media Access Control (MAC) based mechanisms in associating any active TCI states to be the reference TCI state, as it relies on Radio Resource Control (RRC) signalling to configure the TCI state.

A third alternative is that for the case where the Secondary Component Carrier (SCC) in FR2 does not have a configured CORESET, and is cross-carrier scheduled via DCI from a different carrier, a "dummy" CORESET can be configured in the SCC. If the offset between the reception of the DCI corresponding to the cross-carrier PDSCH is less than a threshold, the UE may assume the default beam for PDSCH reception is associated with the TCI state associated with the dummy CORESET. However, the configuration of a dummy Coreset, which this proposed alternative requires, increases higher layer overhead in RRC, most of which is unnecessary simply to be able to indicate an active TCI for the UE to use as a reference TCI state.

All of these are inefficient, as they are either inflexible, too slow, or require large and unnecessary configuration and overhead. Embodiments described herein describe methods to determine the reference TCI that are flexible, fast (i.e., using MAC signalling), and efficient.

Figure 3:
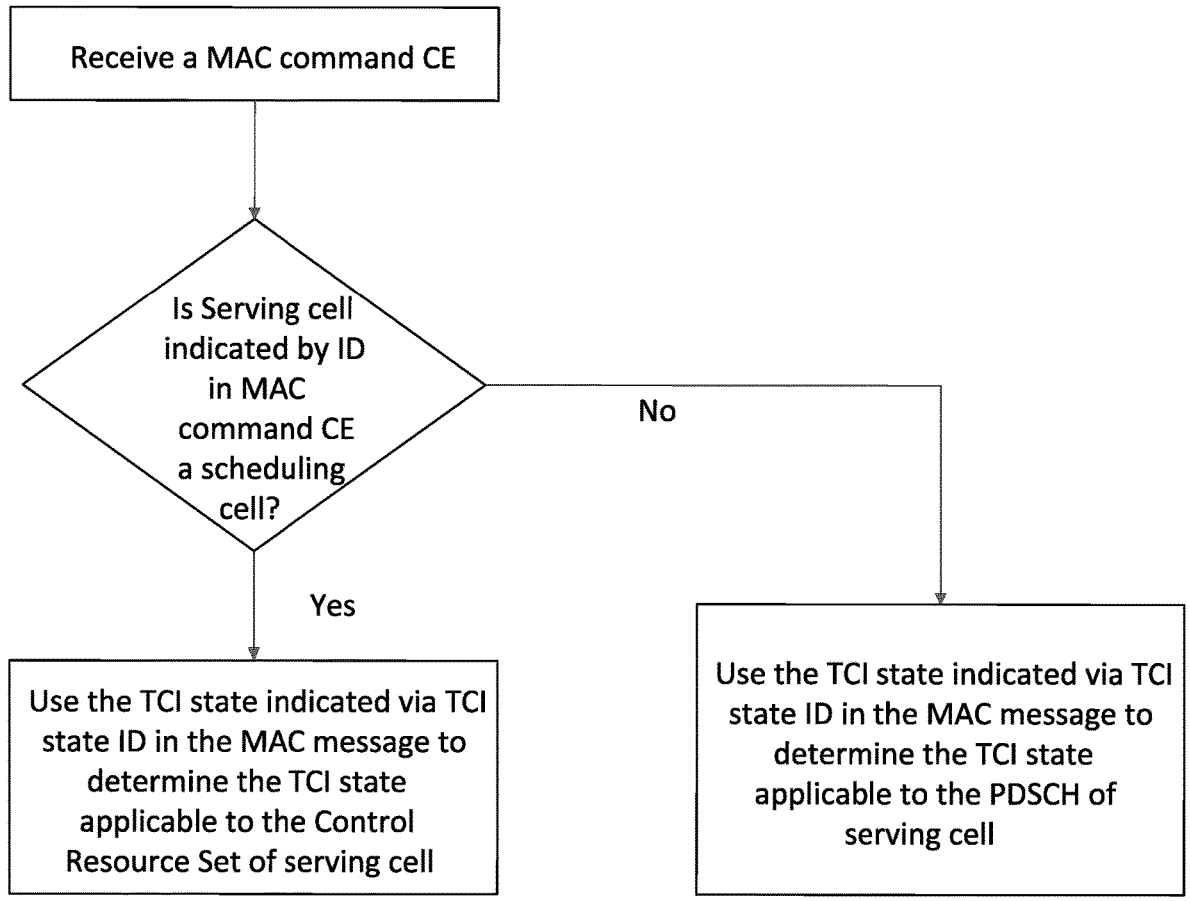
FIG. 3 is a flow diagram of a method of interpreting a TCI state indication.

FIG. 3 depicts method according to one embodiment, wherein a UE communicates with the network using a primary serving cell (Pell). The UE is also configured with one or more secondary serving cells (Scell(s)). The UE is configured with a carrier indicator field to monitor PDCCH for a serving cell 1 (e.g., Scell1) in serving cell 2 (e.g., a PCell or an Scell2). The serving cell 1 can be configured with one or more bandwidth parts (BWPs). The UE receives a MAC message corresponding to "TCI state indication for UE-specific PDCCH MAC CE". If the serving cell ID in the MAC message indicates the ID of serving cell 1, then the UE can ignore the CORESET ID in the MAC and use the TCI state indicated via TCI state ID in the MAC message as a reference TCI state for serving cell 1. If the serving cell 1 has more than one BWPs, the reference TCI state can be applied for the active BWP, or for all BWPs or for a BWP configured by upper layers. Reference TCI state is the TCI state assumed for PDSCH reception in serving cell 1 scheduled by PDCCH in serving cell 2 and if the scheduling timing offset (between the last symbol of the PDCCH and the first symbol of the PDSCH) is smaller than a Delta_Offset threshold. The reference TCI state can be an active TCI state for the serving cell 1. The Delta_Offset can be based on UE capability indication. If the serving cell ID in the MAC message indicates the ID of serving cell 2, the UE uses the TCI state indicated via TCI state ID in the MAC message to determine the TCI state applicable to the Control Resource Set of serving cell 2 (e.g., used for reception of PDCCH on serving cell 2 associated with that Control Resource Set), identified by CORESET ID field in the MAC CE.

Figure 4:
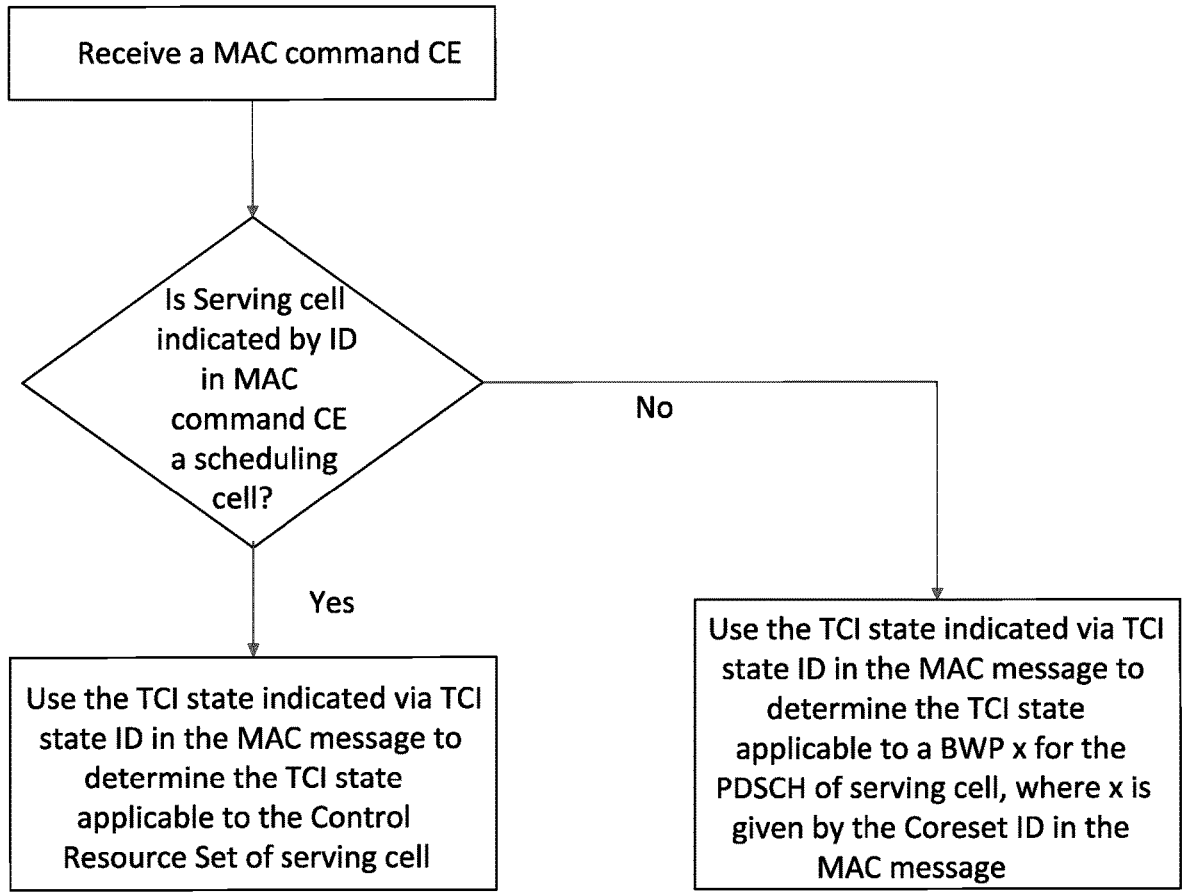
FIG. 4 is a flow diagram of a method of interpreting a CORESET ID indication.

FIG. 4 depicts another embodiment, wherein a UE communicates with the network using a primary serving cell (Pcell). The UE is also configured with one or more secondary serving cells (Scell(s)). The UE is configured with a carrier indicator field to monitor PDCCH for a serving cell 1 (e.g., Scell1) in serving cell 2 (e.g., a PCell or an Scell2). The serving cell 1 can be configured with one or more bandwidth parts (BWPs). The UE receives a MAC message corresponding to "TCI state indication for UE-specific PDCCH MAC CE". If the serving cell ID in the MAC message indicates the ID of serving cell 1, then the UE reinterprets the CORESET ID in the MAC CE as a BWP ID and uses the TCI state indicated via TCI state ID in the MAC message as a reference TCI state for BWP indicated by the BWP ID for the serving cell 1. Reference TCI state is the TCI state assumed for PDSCH reception in serving cell 2 scheduled by PDCCH in serving cell 1 and if the scheduling timing offset (between the last symbol of the PDCCH and the first symbol of the PDSCH) is smaller than a Delta_Offset threshold. The reference TCI state can be an active TCI state for the BWP for the serving cell 1. The Delta_Offset can be based on UE capability indication. If the serving cell ID in the MAC message indicates the ID of serving cell 2, the UE uses the TCI state indicated via TCI state ID in the MAC message to determine the TCI state applicable to the Control Resource Set of serving cell 2 (e.g., used for reception of PDCCH on serving cell 2 associated with that Control Resource Set), identified by CORESET ID field in the MAC CE.

According to embodiments disclosed and claimed herein, a UE can indicate via UE capability signaling if it can support the case where it can support TCI state determination for a cross-carrier scheduled PDSCH with scheduling offset less than the Delta_Offset. In response, the UE can receive from the network an indication of a reference TCI state.

Reference TCI state can be the TCI state that a UE can assume for PDSCH reception in a first component carrier scheduled by PDCCH in a second component carrier and if the scheduling timing offset (between the last symbol of the PDCCH and the first symbol of the PDSCH) is smaller than a Delta_Offset threshold or if Tci-PresentInDCI is not enabled for DCI scheduling the PDSCH.

For a serving cell CC2 that is scheduled from another serving cell CC1, typically the UE is not configured for monitoring PDCCH on CC2. Thus, typically, the MAC CE used for "TCI state indication for UE-specific PDCCH MAC CE" is not applicable for when the serving cell in that MAC CE is set to the ID of CC2. According to embodiments disclosed herein, the MAC CE is reused and applied to indicate the reference TCI state. This can be done by reinterpreting one or more fields in the corresponding MAC CE.

The MAC CE can contain the following fields: 1) Serving cell ID, 2) CORESET ID and 3) TCI State ID.

The serving cell ID indicates the identity of the serving cell for which the MAC CE applies. If it indicates that the serving cell is a scheduling service cell, the UE may ignore the CORESET ID and apply the TCI state indicated via TCI state ID as the reference TCI state. On the other hand, if the serving cell ID indicates that the serving cell is not a scheduling serving cell, the UE may reinterpret the CORESET ID field as a BWP indicator, and apply the TCI state indicated via TCI state ID as the reference TCI state for the corresponding BWP. Since the CORESET ID field can be 4 bits, it can be reused to indicate the BWP index (which can be less than or equal to 4).

Figure 5:
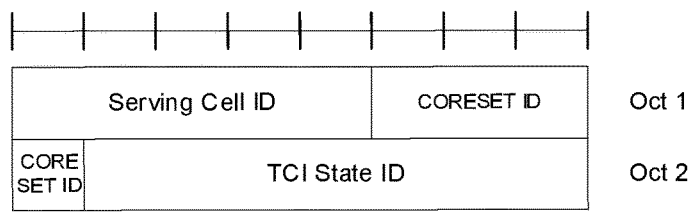
FIG. 5 is a diagram of bit assignments in a MAC command CE.
Figure 6:
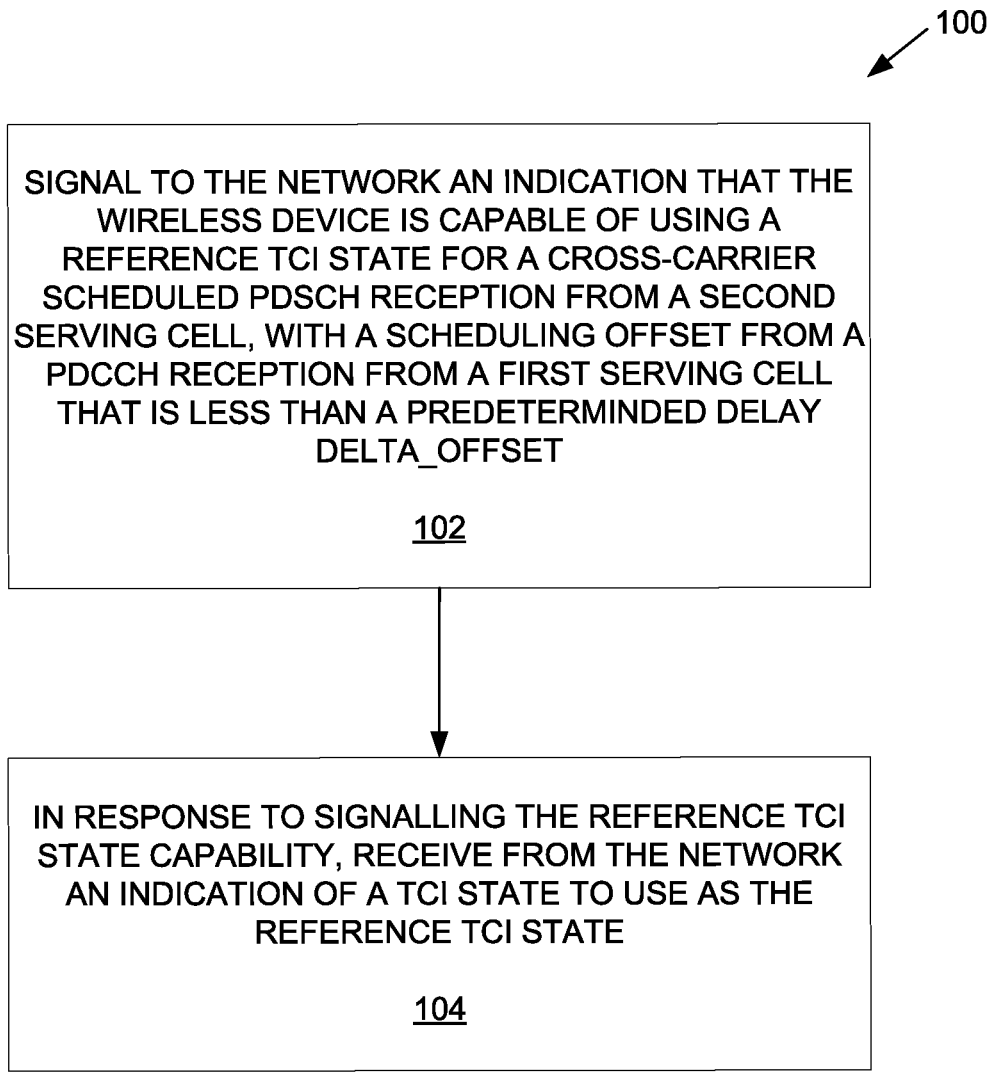
FIG. 6 is a flow diagram of a method of signalling a reference TCI state capability.

FIG. 5, reproduced from FIG. 6.1.3.15-1 of 3GPP TS 38.321 V15.5.0, is an example of a MAC command CE for TCI state indication for UE-specific PDCCH MAC CE. The TCI State Indication for UE-specific PDCCH MAC CE is identified by a MAC PDU subheader with LCID as specified in Table 6.2.1-1. It has a fixed size of 16 bits with following fields:

Serving Cell ID: This field indicates the identity of the Serving Cell for which the MAC CE applies. The length of the field is 5 bits;

CORESET ID: This field indicates a Control Resource Set identified with ControlResourceSetId as specified in TS 38.331, for which the TCI State is being indicated. In case the value of the field is 0, the field refers to the Control Resource Set configured by controlResourceSetZero as specified in TS 38.331. The length of the field is 4 bits;

TCI State ID: This field indicates the TCI state identified by TCI-StateId as specified in TS 38.331 V15.5.1, applicable to the Control Resource Set identified by the CORESET ID field. If the field of CORESET ID is set to 0, the TCI State ID field indicates a TCI-StateId for a TCI state of the first 64 TCI-states configured by tci-States-ToAddModList and tci-States-ToReleaseList in the PDSCH-Config in the active BWP. If the field of CORESET ID is set to a value other than 0, the TCI State ID field indicates a TCI-StateId configured by tci-StatesPDCCH-ToAddList and tci-StatesPDCCH-ToReleaseList in the controlResourceSet identified by the indicated CORESET ID. The length of the TCI State ID field is 7 bits.

FIG. 6 depicts a method 100, performed by a wireless device configured for cross-carrier scheduling in a wireless communication network, in accordance with particular embodiments. An indication is signalled to the network that the wireless device is capable of using a reference TCI state for a cross-carrier scheduled PDSCH reception from a second serving cell, with a scheduling offset from a PDCCH reception from a first serving cell that is less than a predeterminded delay Delta_Offset (block 102). In response to signalling the reference TCI state capability, an indication is received from the network of a TCI state to use as the reference TCI state (block 104).

Figure 7:
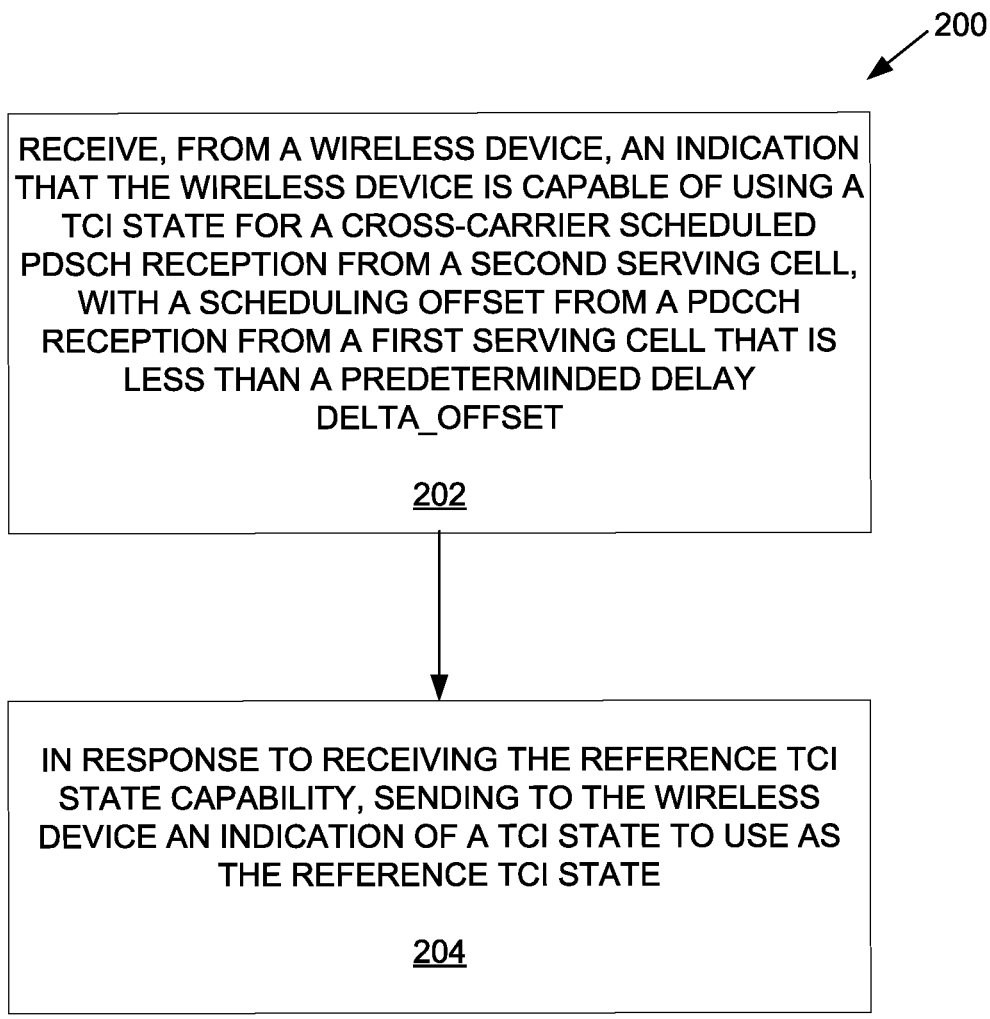
FIG. 7 is a flow diagram of a method of indicating a reference TCI state.

FIG. 7 depicts a method 200, performed by a base station operative in a wireless communication network, of providing a reference TCI state indication to a cross-carrier scheduled wireless device, in accordance with particular embodiments. An indication is received from a wireless device that the wireless device is capable of using a reference TCI state for a cross-carrier scheduled PDSCH reception from a second serving cell, with a scheduling offset from a PDCCH reception from a first serving cell that is less than a predeterminded delay Delta_Offset (block 202). In response to receiving the reference TCI state capability, an indication is sent to the wireless device of a TCI state to use as the reference TCI state (block 204).

Note that the apparatuses described herein may perform the method 100 herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
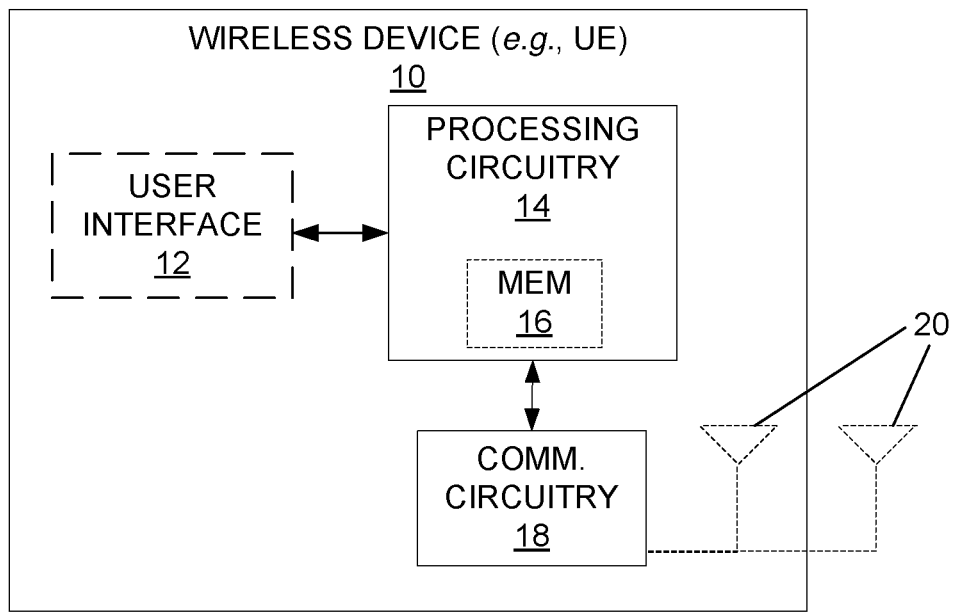
FIG. 8 is a hardware block diagram of a wireless device.

FIG. 8 for example illustrates a wireless device 10 as implemented in accordance with one or more embodiments. As shown, the wireless device 10 includes processing circuitry 14 and communication circuitry 18. The communication circuitry 18 (e.g., radio circuitry) is configured to transmit and/or receive information to and/or from one or more other nodes, e.g., via any communication technology. Such communication may occur via one or more antennas 20 that are either internal or external to the wireless device 10. The processing circuitry 14 is configured to perform processing described above, such as by executing instructions stored in memory 16. The processing circuitry 14 in this regard may implement certain functional means, units, or modules.

Figure 9:
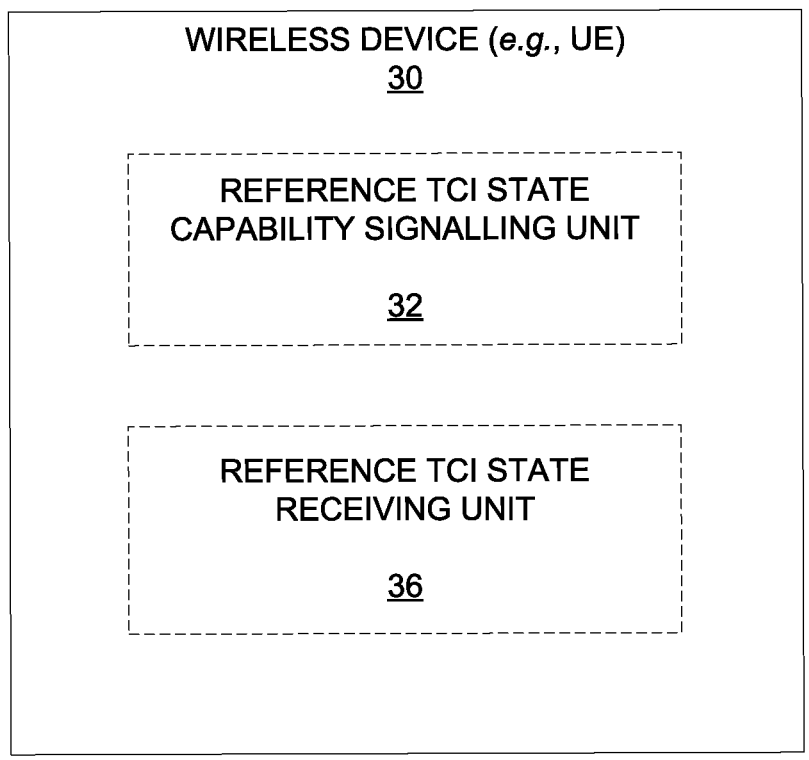
FIG. 9 is a functional block diagram of a wireless device.
Figure 11:
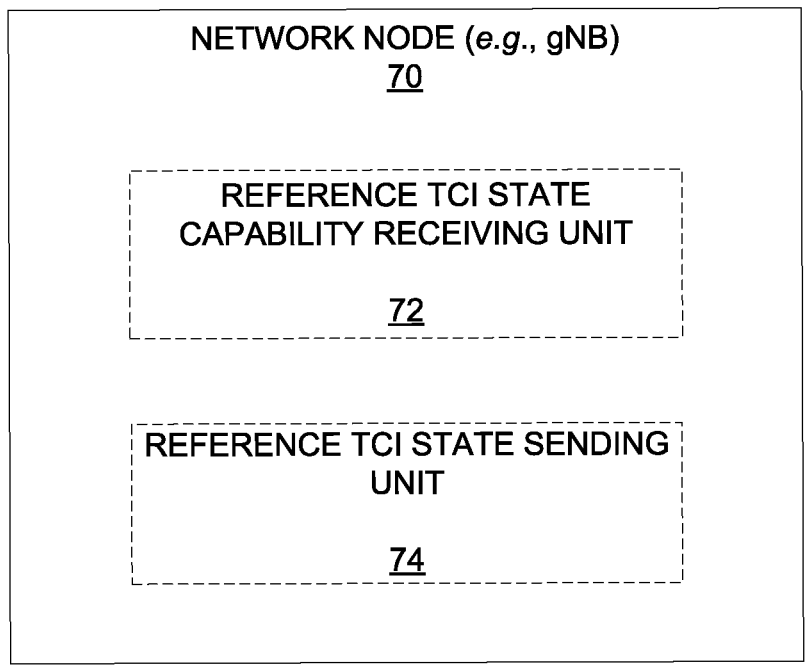
FIG. 11 is a functional block diagram of a network node.

FIG. 9 illustrates a block diagram of a wireless device 30 in a wireless network according to still other embodiments (for example, the wireless network shown in FIG. 11). As shown, the wireless device 30 implements various functional means, units, or modules, e.g., via the processing circuitry 14 in FIG. 8 and/or via software code. These functional means, units, or modules, e.g., for implementing the method(s) herein, include for instance: a reference TCI state capability signalling unit 32, and a reference TCI state receiving unit 34.

The reference TCI state capability signalling unit 32 is configured to signal to the network an indication that the wireless device is capable of using a reference TCI state for a cross-carrier scheduled PDSCH reception from a second serving cell, with a scheduling offset from a PDCCH reception from a first serving cell that is less than a predeterminded delay Delta_Offset. The reference TCI state receiving unit 34 is configured to, in response to signalling the reference TCI state capability, receive from the network an indication of a TCI state to use as the reference TCI state.

Figure 10:
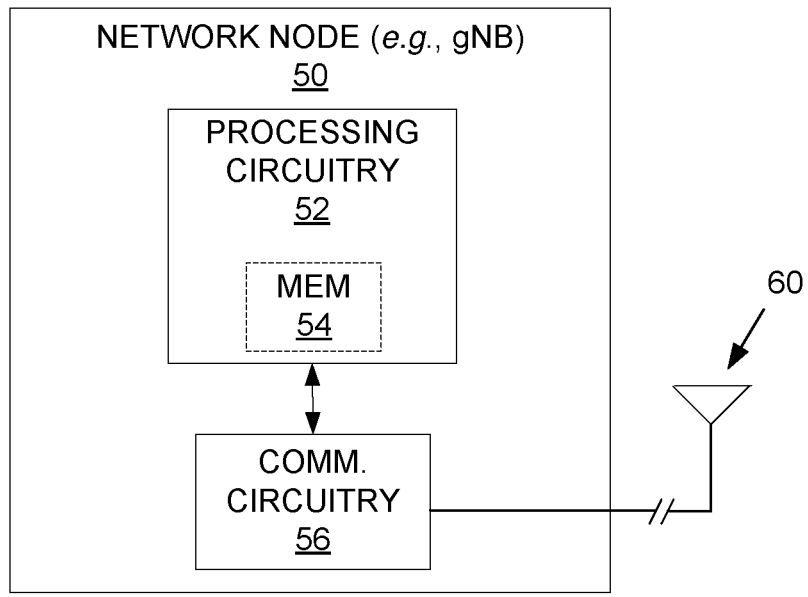
FIG. 10 is a hardware block diagram of a network node.

FIG. 10 illustrates a network node 50 as implemented in accordance with one or more embodiments. As shown, the network node 11 includes processing circuitry 52 and communication circuitry 56. The communication circuitry 56 is configured to transmit and/or receive information to and/or from one or more other nodes, e.g., via any communication technology. In the event that the network node is a base station, e.g., a gNB, operative to communicate with one or more wireless devices, the communication circuitry 56 includes a transceiver and the network node 50 includes one or more antennas 60. As indicated by the broken connection, the antennas 60 may be remotely located from the network node 50, such as on a building or tower. The processing circuitry 52 is configured to perform processing described above, such as by executing instructions stored in memory 54. The processing circuitry 52 in this regard may implement certain functional means, units, or modules.

Figure 12:
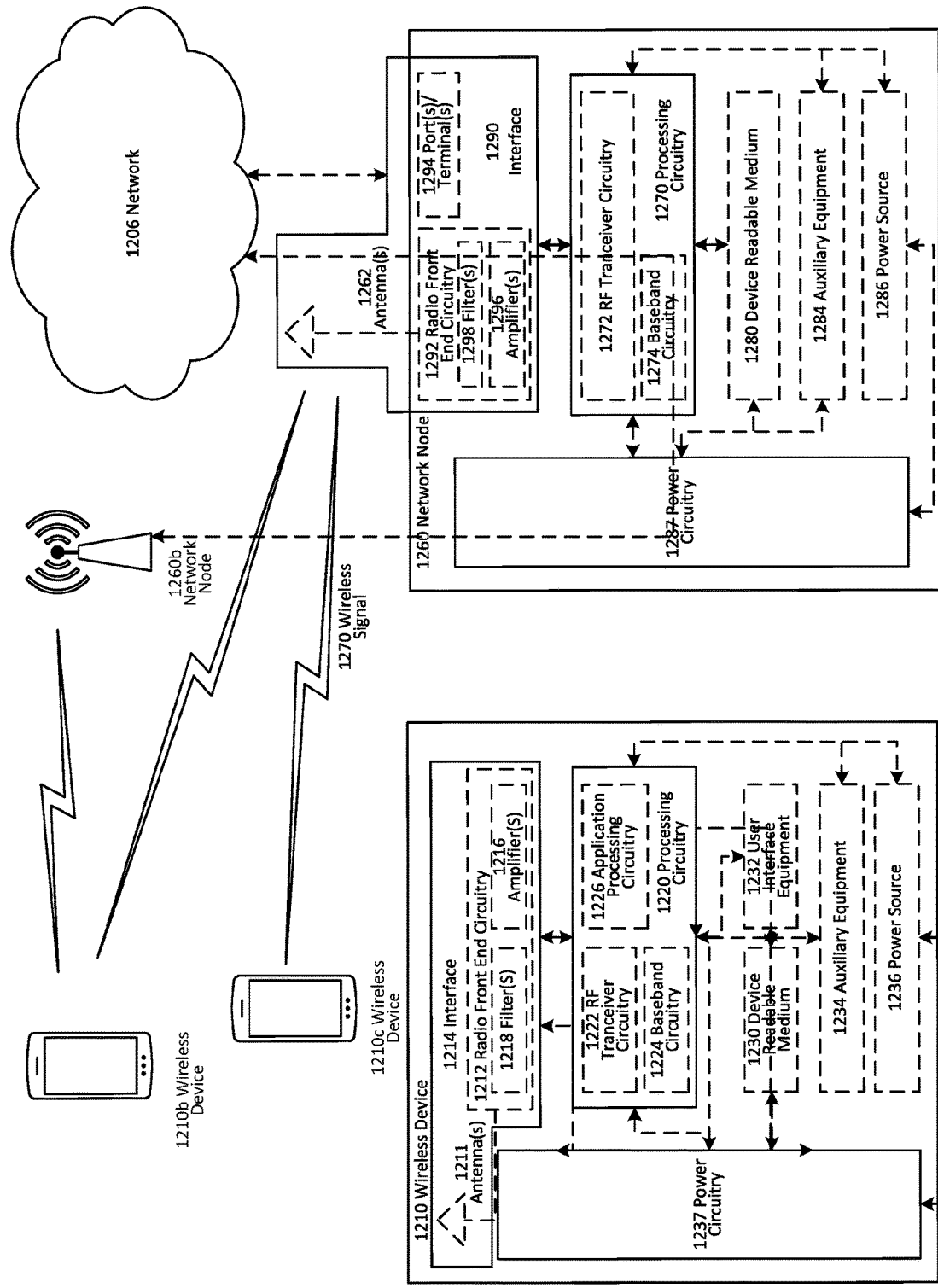
FIG. 12 is a block diagram of components of a wireless communication network.

FIG. 11 illustrates a block diagram of a network node 70 in a wireless network according to still other embodiments (for example, the wireless network shown in FIG. 12). As shown, the network node 70 implements various functional means, units, or modules, e.g., via the processing circuitry 54 in FIG. 10 and/or via software code. These functional means, units, or modules, e.g., for implementing the method(s) herein, include for instance: a reference TCI state capability receiving unit 72, and a reference TCI state sending unit 74.

The reference TCI state capability receiving unit 72 is configured to receive from a wireless device an indication that the wireless device is capable of using a reference TCI state for a cross-carrier scheduled PDSCH reception from a second serving cell, with a scheduling offset from a PDCCH reception from a first serving cell that is less than a predeterminded delay Delta_Offset. The reference TCI state sending unit 74 is configured to, in response to receiving the reference TCI state capability, send an indication to the wireless device of a TCI state to use as the reference TCI state.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260b, and wireless devices 1210, 1210b, and 1210c. In practice, a wireless network may further include any additional elements suitable to support communication between wireless devices or between a wireless device and another communication device, such as a landline telephone, a service provider, or any other network node or end device. Of the illustrated components, network node 1260 and wireless device 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and wireless device 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and a RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, WiFi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part or all of RF transceiver circuitry 1272 and baseband processing circuitry 1274 may be on the same chip or set of chips, boards, or units In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260, but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

Interface 1290 is used in the wired or wireless communication of signalling and/or data between network node 1260, network 1206, and/or wireless devices 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or wireless devices via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device ( ) refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. wireless device 1210 may include multiple sets of one or more of the illustrated components for different wireless technologies supported by wireless device 1210, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within wireless device 1210.

Antenna 1211 may include one or more antennas or antenna arrays, configured to send and/or receive wireless signals, and is connected to interface 1214. In certain alternative embodiments, antenna 1211 may be separate from wireless device 1210 and be connectable to wireless device 1210 through an interface or port. Antenna 1211, interface 1214, and/or processing circuitry 1220 may be configured to perform any receiving or transmitting operations described herein as being performed by a wireless device. Any information, data and/or signals may be received from a network node and/or another wireless device. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, wireless device 1210 may not include separate radio front end circuitry 1212; rather, processing circuitry 1220 may comprise radio front end circuitry and may be connected to antenna 1211. Similarly, in some embodiments, some or all of RF transceiver circuitry 1222 may be considered a part of interface 1214. Radio front end circuitry 1212 may receive digital data that is to be sent out to other network nodes or wireless devices via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 1210 components, such as device readable medium 1230, wireless device 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of wireless device 1210 may comprise a SOC. In some embodiments, RF transceiver circuitry 1222, baseband processing circuitry 1224, and application processing circuitry 1226 may be on separate chips or sets of chips. In alternative embodiments, part or all of baseband processing circuitry 1224 and application processing circuitry 1226 may be combined into one chip or set of chips, and RF transceiver circuitry 1222 may be on a separate chip or set of chips. In still alternative embodiments, part or all of RF transceiver circuitry 1222 and baseband processing circuitry 1224 may be on the same chip or set of chips, and application processing circuitry 1226 may be on a separate chip or set of chips. In yet other alternative embodiments, part or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a wireless device may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of wireless device 1210, but are enjoyed by wireless device 1210 as a whole, and/or by end users and the wireless network generally.

Processing circuitry 1220 may be configured to perform any determining, calculating, or similar operations (e.g., certain obtaining operations) described herein as being performed by a wireless device. These operations, as performed by processing circuitry 1220, may include processing information obtained by processing circuitry 1220 by, for example, converting the obtained information into other information, comparing the obtained information or converted information to information stored by wireless device 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with wireless device 1210. Such interaction may be of many forms, such as visual, audial, tactile, etc. User interface equipment 1232 may be operable to produce output to the user and to allow the user to provide input to wireless device 1210. The type of interaction may vary depending on the type of user interface equipment 1232 installed in wireless device 1210. For example, if wireless device 1210 is a smart phone, the interaction may be via a touch screen; if wireless device 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices and circuits. User interface equipment 1232 is configured to allow input of information into wireless device 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from wireless device 1210, and to allow processing circuitry 1220 to output information from wireless device 1210. User interface equipment 1232 may include, for example, a speaker, a display, vibrating circuitry, a USB port, a headphone interface, or other output circuitry. Using one or more input and output interfaces, devices, and circuits, of user interface equipment 1232, wireless device 1210 may communicate with end users and/or the wireless network, and allow them to benefit from the functionality described herein.

Auxiliary equipment 1234 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. wireless device 1210 may further comprise power circuitry 1237 for delivering power from power source 1236 to the various parts of wireless device 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case wireless device 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of wireless device 1210 to which power is supplied.

Figure 13:
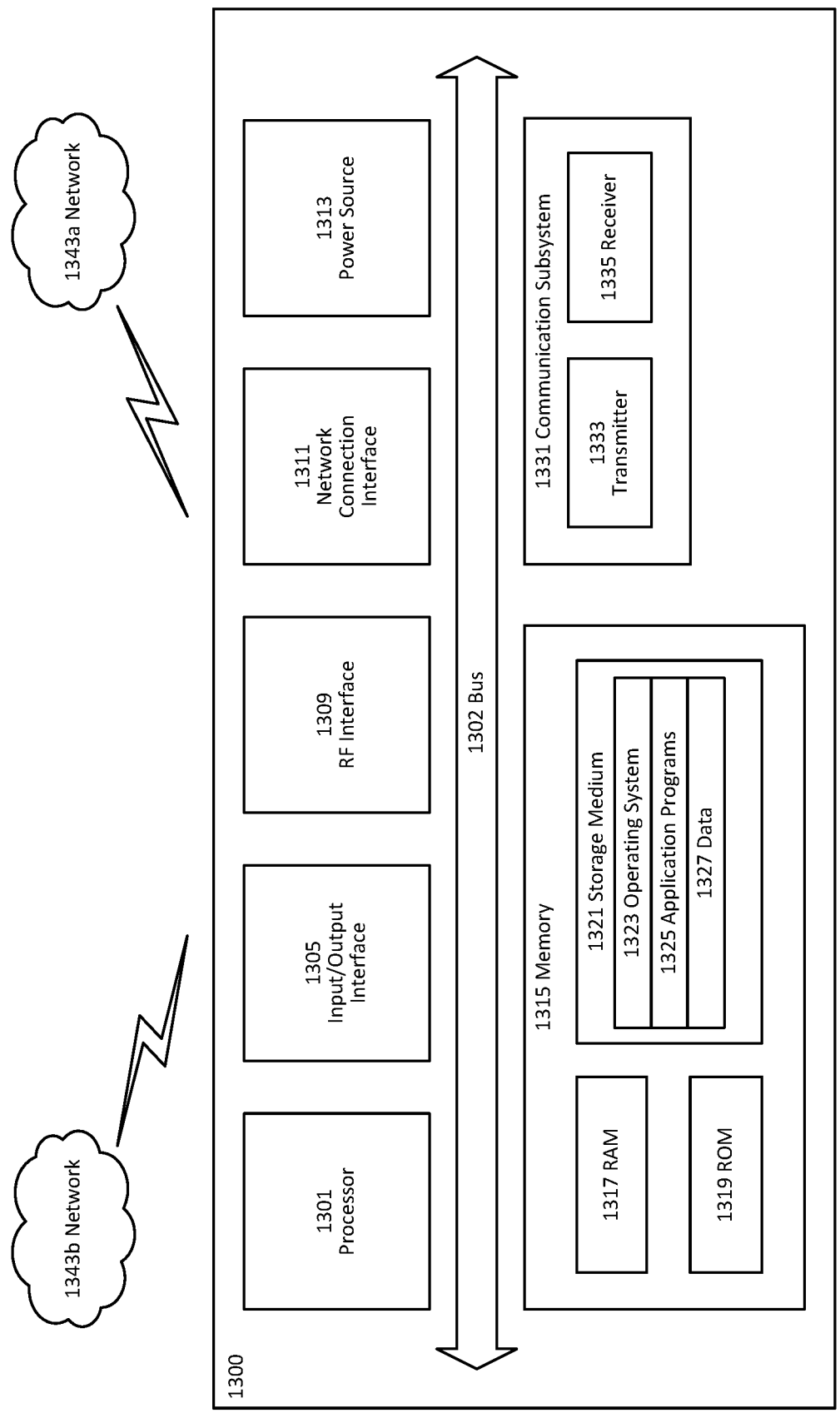
FIG. 13 is a block diagram of a UE.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the 3$^{rd}$ Generation Partnership Project (3GPP), including a NB-IoT UE, a machine type communication (MTC) UE, and/or an enhanced MTC (eMTC) UE. UE 1300, as illustrated in FIG. 13, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 13 is a UE, the components discussed herein are equally applicable to a wireless device, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device. UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, RF interface 1309 may be configured to provide a communication interface to RF components such as a transmitter, a receiver, and an antenna. Network connection interface 1311 may be configured to provide a communication interface to network 1343a. Network 1343a may encompass wired and/or wireless networks such as a local-area network (LAN), a wide-area network (WAN), a computer network, a wireless network, a telecommunications network, another like network or any combination thereof. For example, network 1343a may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343b using communication subsystem 1331. Network 1343a and network 1343b may be the same network or networks or different network or networks. Communication subsystem 1331 may be configured to include one or more transceivers used to communicate with network 1343b. For example, communication subsystem 1331 may be configured to include one or more transceivers used to communicate with one or more remote transceivers of another device capable of wireless communication such as another wireless device, UE, or base station of a radio access network (RAN) according to one or more communication protocols, such as IEEE 802.13, CDMA, WCDMA, GSM, LTE, UTRAN, WiMax, or the like. Each transceiver may include transmitter 1333 and/or receiver 1335 to implement transmitter or receiver functionality, respectively, appropriate to the RAN links (e.g., frequency allocations and the like). Further, transmitter 1333 and receiver 1335 of each transceiver may share circuit components, software or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343b may encompass wired and/or wireless networks such as a local-area network (LAN), a wide-area network (WAN), a computer network, a wireless network, a telecommunications network, another like network or any combination thereof. For example, network 1343b may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
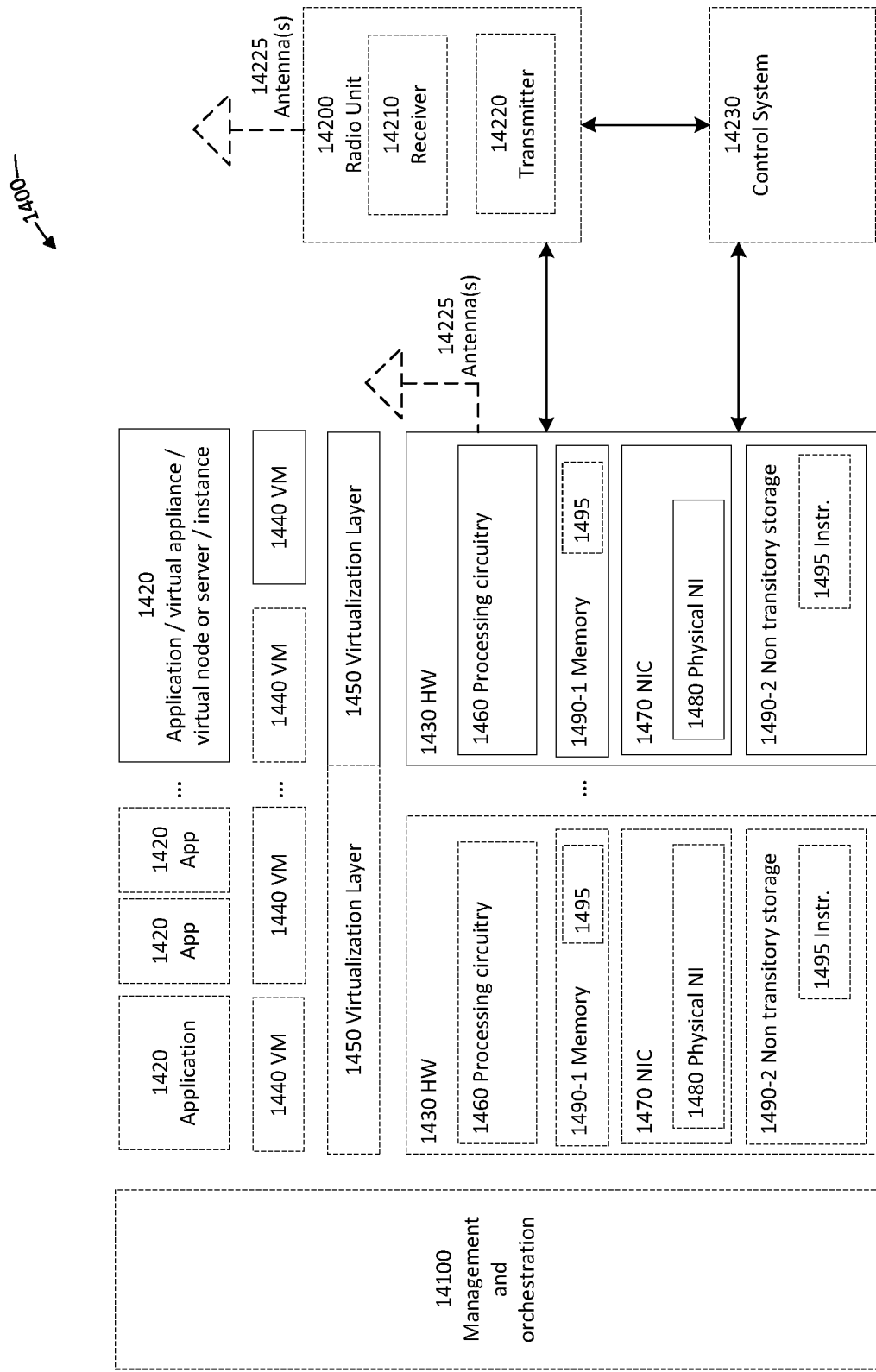
FIG. 14 is a block diagram of a virtualization environment.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g. such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signalling can be effected with the use of control system 14230 which may alternatively be used for communication between the hardware nodes 1430 and radio units 14200.

Figure 15:
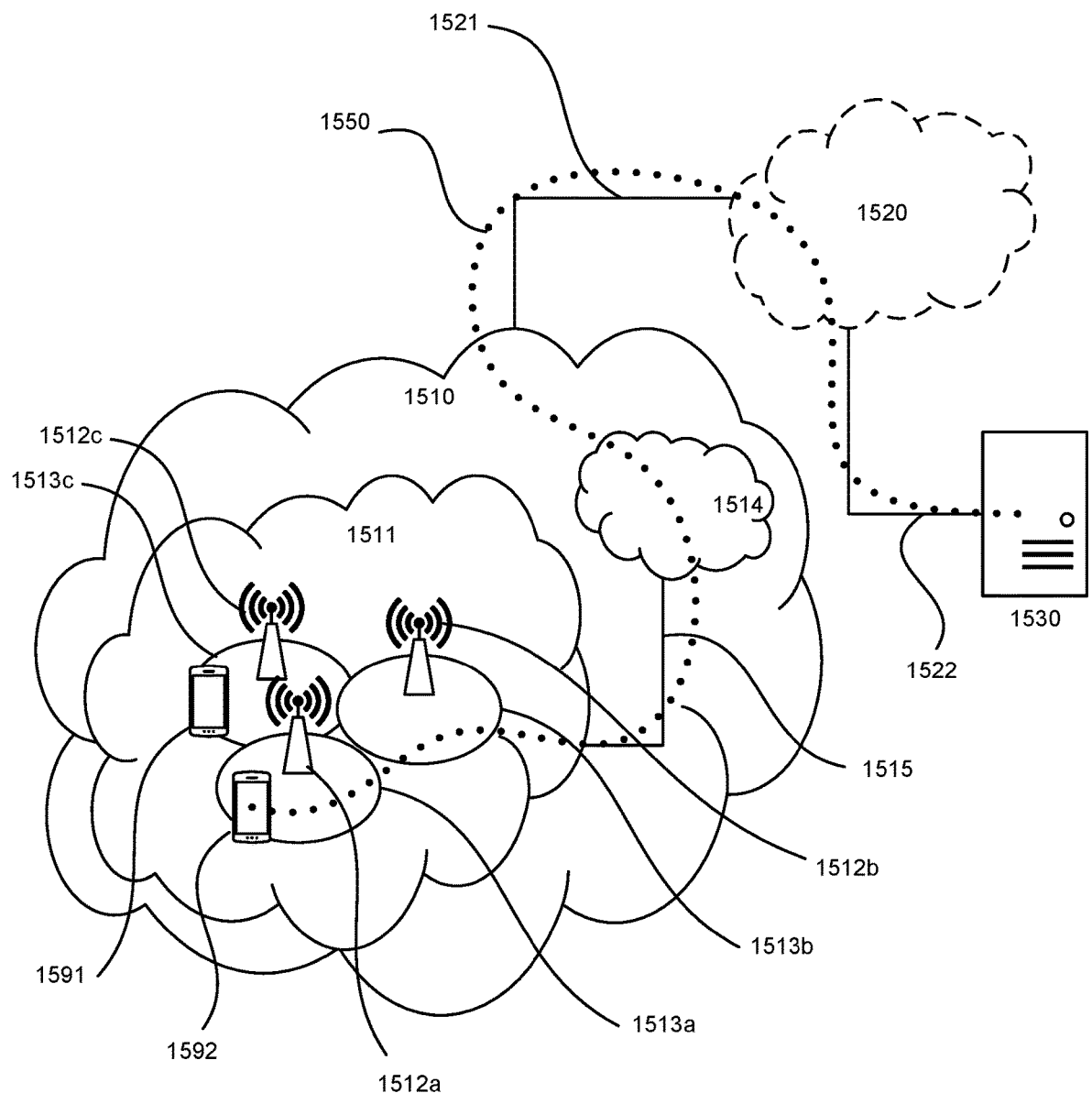
FIG. 15 is a diagram of a telecommunication network connected via an intermediate network to a host computer.

FIG. 15 illustrates a telecommunication network connected via an intermediate network to a host computer in accordance with some embodiments. In particular, with reference to FIG. 15, in accordance with an embodiment, a communication system includes telecommunication network 1510, such as a 3GPP-type cellular network, which comprises access network 1511, such as a radio access network, and core network 1514. Access network 1511 comprises a plurality of base stations 1512a, 1512b, 1512c, such as NBs, eNBs, gNBs or other types of wireless access points, each defining a corresponding coverage area 1513a, 1513b, 1513c. Each base station 1512a, 1512b, 1512c is connectable to core network 1514 over a wired or wireless connection 1515. A first UE 1591 located in coverage area 1513c is configured to wirelessly connect to, or be paged by, the corresponding base station 1512c. A second UE 1592 in coverage area 1513a is wirelessly connectable to the corresponding base station 1512a. While a plurality of UEs 1591, 1592 are illustrated in this example, the disclosed embodiments are equally applicable to a situation where a sole UE is in the coverage area or where a sole UE is connecting to the corresponding base station 1512.

Telecommunication network 1510 is itself connected to host computer 1530, which may be embodied in the hardware and/or software of a standalone server, a cloud-implemented server, a distributed server or as processing resources in a server farm. Host computer 1530 may be under the ownership or control of a service provider, or may be operated by the service provider or on behalf of the service provider. Connections 1521 and 1522 between telecommunication network 1510 and host computer 1530 may extend directly from core network 1514 to host computer 1530 or may go via an optional intermediate network 1520. Intermediate network 1520 may be one of, or a combination of more than one of, a public, private or hosted network; intermediate network 1520, if any, may be a backbone network or the Internet; in particular, intermediate network 1520 may comprise two or more sub-networks (not shown).

The communication system of FIG. 15 as a whole enables connectivity between the connected UEs 1591, 1592 and host computer 1530. The connectivity may be described as an over-the-top (OTT) connection 1550. Host computer 1530 and the connected UEs 1591, 1592 are configured to communicate data and/or signaling via OTT connection 1550, using access network 1511, core network 1514, any intermediate network 1520 and possible further infrastructure (not shown) as intermediaries. OTT connection 1550 may be transparent in the sense that the participating communication devices through which OTT connection 1550 passes are unaware of routing of uplink and downlink communications. For example, base station 1512 may not or need not be informed about the past routing of an incoming downlink communication with data originating from host computer 1530 to be forwarded (e.g., handed over) to a connected UE 1591. Similarly, base station 1512 need not be aware of the future routing of an outgoing uplink communication originating from the UE 1591 towards the host computer 1530.

Figure 16:
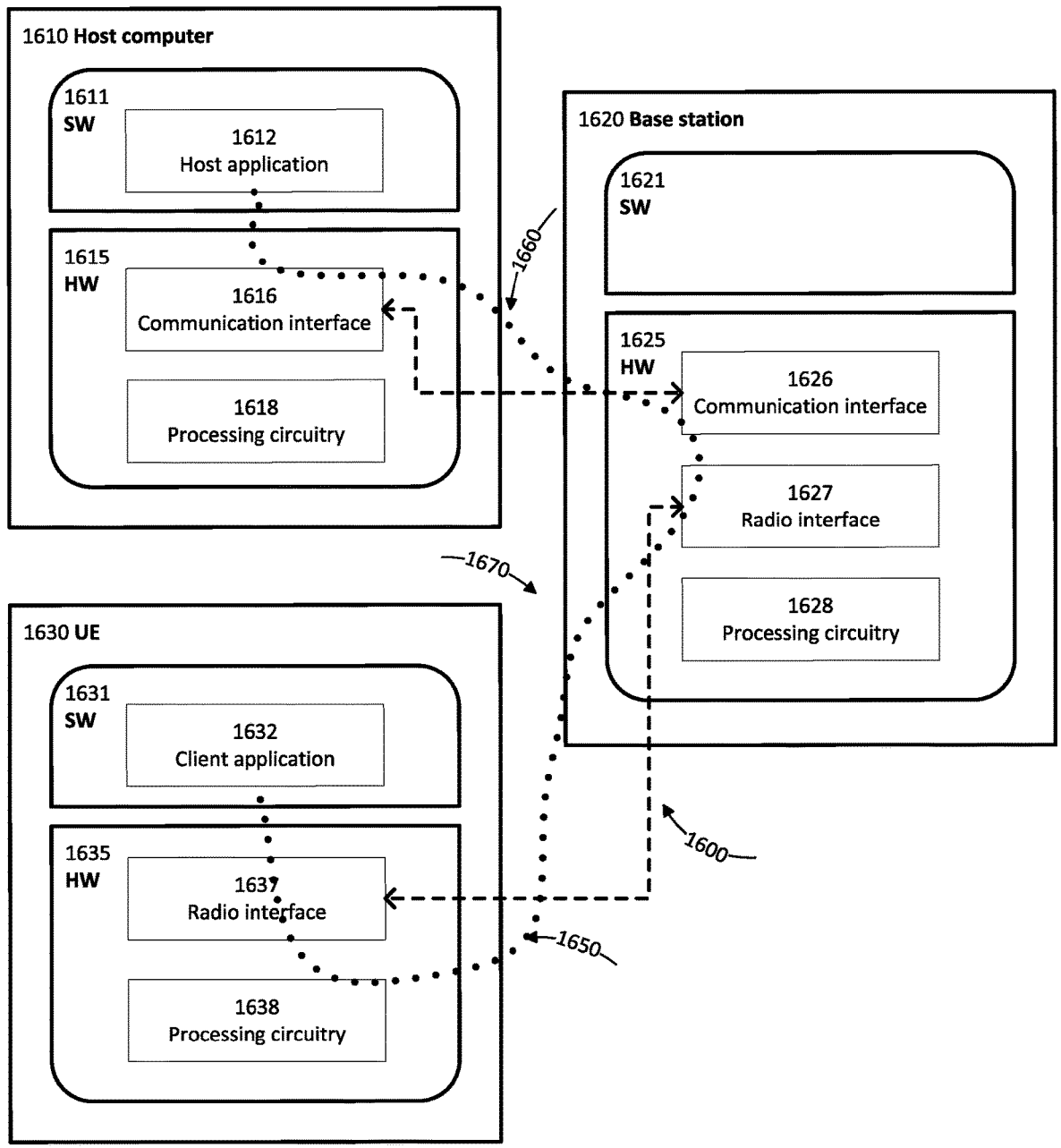
FIG. 16 is a diagram of a host computer communicating via a base station with a UE over a partially wireless connection.

Example implementations, in accordance with an embodiment, of the UE, base station and host computer discussed in the preceding paragraphs will now be described with reference to FIG. 16. FIG. 16 illustrates host computer communicating via a base station with a user equipment over a partially wireless connection in accordance with some embodiments. In communication system 1600, host computer 1610 comprises hardware 1615 including communication interface 1616 configured to set up and maintain a wired or wireless connection with an interface of a different communication device of communication system 1600. Host computer 1610 further comprises processing circuitry 1618, which may have storage and/or processing capabilities. In particular, processing circuitry 1618 may comprise one or more programmable processors, application-specific integrated circuits, field programmable gate arrays or combinations of these (not shown) adapted to execute instructions. Host computer 1610 further comprises software 1611, which is stored in or accessible by host computer 1610 and executable by processing circuitry 1618. Software 1611 includes host application 1612. Host application 1612 may be operable to provide a service to a remote user, such as UE 1630 connecting via OTT connection 1650 terminating at UE 1630 and host computer 1610. In providing the service to the remote user, host application 1612 may provide user data which is transmitted using OTT connection 1650.

Communication system 1600 further includes base station 1620 provided in a telecommunication system and comprising hardware 1625 enabling it to communicate with host computer 1610 and with UE 1630. Hardware 1625 may include communication interface 1626 for setting up and maintaining a wired or wireless connection with an interface of a different communication device of communication system 1600, as well as radio interface 1627 for setting up and maintaining at least wireless connection 1670 with UE 1630 located in a coverage area (not shown in FIG. 16) served by base station 1620. Communication interface 1626 may be configured to facilitate connection 1660 to host computer 1610. Connection 1660 may be direct or it may pass through a core network (not shown in FIG. 16) of the telecommunication system and/or through one or more intermediate networks outside the telecommunication system. In the embodiment shown, hardware 1625 of base station 1620 further includes processing circuitry 1628, which may comprise one or more programmable processors, application-specific integrated circuits, field programmable gate arrays or combinations of these (not shown) adapted to execute instructions. Base station 1620 further has software 1621 stored internally or accessible via an external connection.

Communication system 1600 further includes UE 1630 already referred to. Its hardware 1635 may include radio interface 1637 configured to set up and maintain wireless connection 1670 with a base station serving a coverage area in which UE 1630 is currently located. Hardware 1635 of UE 1630 further includes processing circuitry 1638, which may comprise one or more programmable processors, application-specific integrated circuits, field programmable gate arrays or combinations of these (not shown) adapted to execute instructions. UE 1630 further comprises software 1631, which is stored in or accessible by UE 1630 and executable by processing circuitry 1638. Software 1631 includes client application 1632. Client application 1632 may be operable to provide a service to a human or non-human user via UE 1630, with the support of host computer 1610. In host computer 1610, an executing host application 1612 may communicate with the executing client application 1632 via OTT connection 1650 terminating at UE 1630 and host computer 1610. In providing the service to the user, client application 1632 may receive request data from host application 1612 and provide user data in response to the request data. OTT connection 1650 may transfer both the request data and the user data. Client application 1632 may interact with the user to generate the user data that it provides.

It is noted that host computer 1610, base station 1620 and UE 1630 illustrated in FIG. 16 may be similar or identical to host computer 1530, one of base stations 1512a, 1512b, 1512c and one of UEs 1591, 1592 of FIG. 15, respectively. This is to say, the inner workings of these entities may be as shown in FIG. 16 and independently, the surrounding network topology may be that of FIG. 15.

In FIG. 16, OTT connection 1650 has been drawn abstractly to illustrate the communication between host computer 1610 and UE 1630 via base station 1620, without explicit reference to any intermediary devices and the precise routing of messages via these devices. Network infrastructure may determine the routing, which it may be configured to hide from UE 1630 or from the service provider operating host computer 1610, or both. While OTT connection 1650 is active, the network infrastructure may further take decisions by which it dynamically changes the routing (e.g., on the basis of load balancing consideration or reconfiguration of the network).

Wireless connection 1670 between UE 1630 and base station 1620 is in accordance with the teachings of the embodiments described throughout this disclosure. One or more of the various embodiments improve the performance of OTT services provided to UE 1630 using OTT connection 1650, in which wireless connection 1670 forms the last segment. More precisely, the teachings of these embodiments may lower the maximum (N)PRACH load seen at the base station 1620—particularly from M2M/MTC devices triggering at the same time or on the same event. Furthermore, the methods of (N)PRACH load distribution descried herein are implicit and do not require explicit signaling. This provides benefits such as further reducing overhead and hence maximizing system capacity. It also lowers processing requirements in the eNB, and reduces the probability of collisions. This may result in reduced power consumption for UEs 1630 (by avoiding repetitions of the RA process), thus prolonging battery life.

A measurement procedure may be provided for the purpose of monitoring data rate, latency and other factors on which the one or more embodiments improve. There may further be an optional network functionality for reconfiguring OTT connection 1650 between host computer 1610 and UE 1630, in response to variations in the measurement results. The measurement procedure and/or the network functionality for reconfiguring OTT connection 1650 may be implemented in software 1611 and hardware 1615 of host computer 1610 or in software 1631 and hardware 1635 of UE 1630, or both. In embodiments, sensors (not shown) may be deployed in or in association with communication devices through which OTT connection 1650 passes; the sensors may participate in the measurement procedure by supplying values of the monitored quantities exemplified above, or supplying values of other physical quantities from which software 1611, 1631 may compute or estimate the monitored quantities. The reconfiguring of OTT connection 1650 may include message format, retransmission settings, preferred routing etc.; the reconfiguring need not affect base station 1620, and it may be unknown or imperceptible to base station 1620. Such procedures and functionalities may be known and practiced in the art. In certain embodiments, measurements may involve proprietary UE signaling facilitating host computer 1610's measurements of throughput, propagation times, latency and the like. The measurements may be implemented in that software 1611 and 1631 causes messages to be transmitted, in particular empty or 'dummy' messages, using OTT connection 1650 while it monitors propagation times, errors etc.

Figure 17:
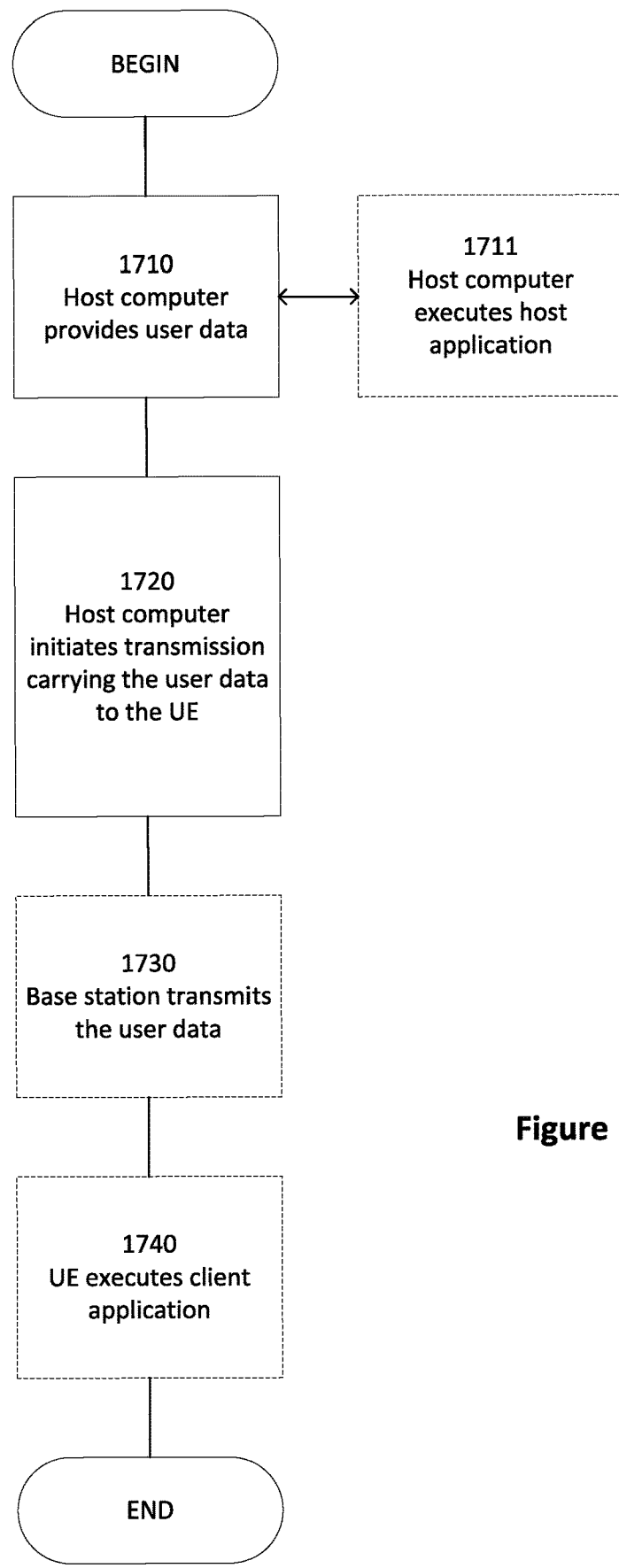
FIG. 17 is a flow diagram of a method of a host computer providing user data to a UE.

FIG. 17 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 17 will be included in this section. In step 1710, the host computer provides user data. In substep 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

Figure 18:
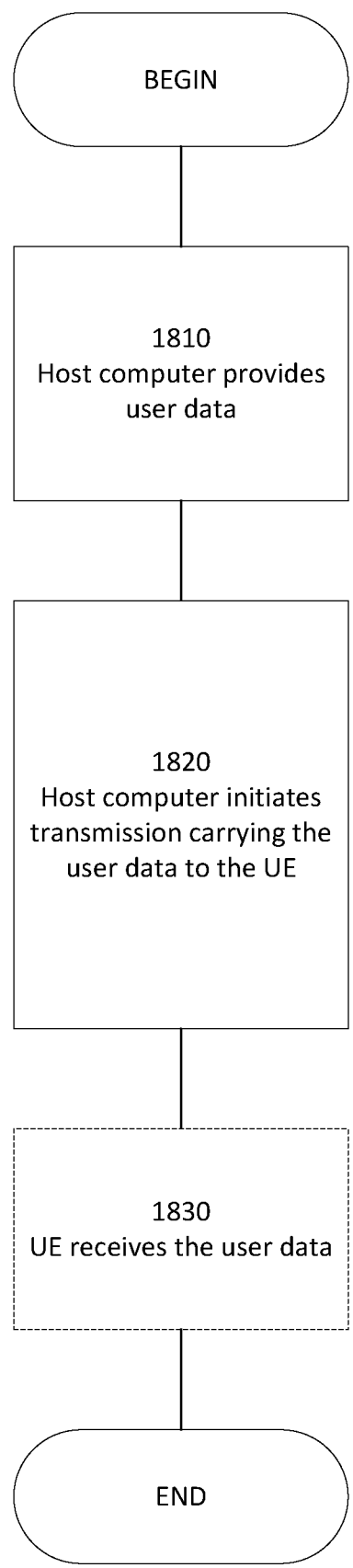
FIG. 18 is a flow diagram of a method of a host computer transmitting user data to a UE.

FIG. 18 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 18 will be included in this section. In step 1810 of the method, the host computer provides user data. In an optional substep (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

Figure 19:
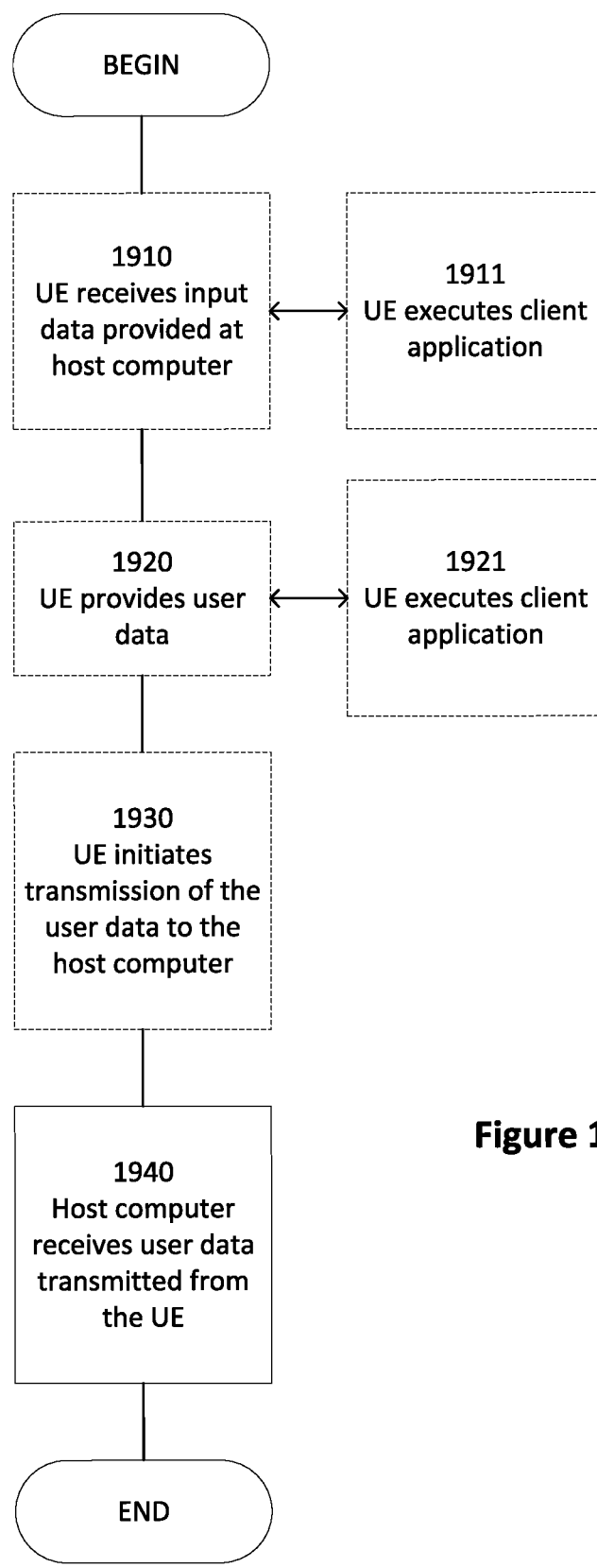
FIG. 19 is a flow diagram of a method of a host computer receiving user data from a UE.

FIG. 19 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In substep 1921 (which may be optional) of step 1920, the UE provides the user data by executing a client application. In substep 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in substep 1930 (which may be optional), transmission of the user data to the host computer. In step 1940 of the method, the host computer receives the user data transmitted from the UE, in accordance with the teachings of the embodiments described throughout this disclosure.

Figure 20:
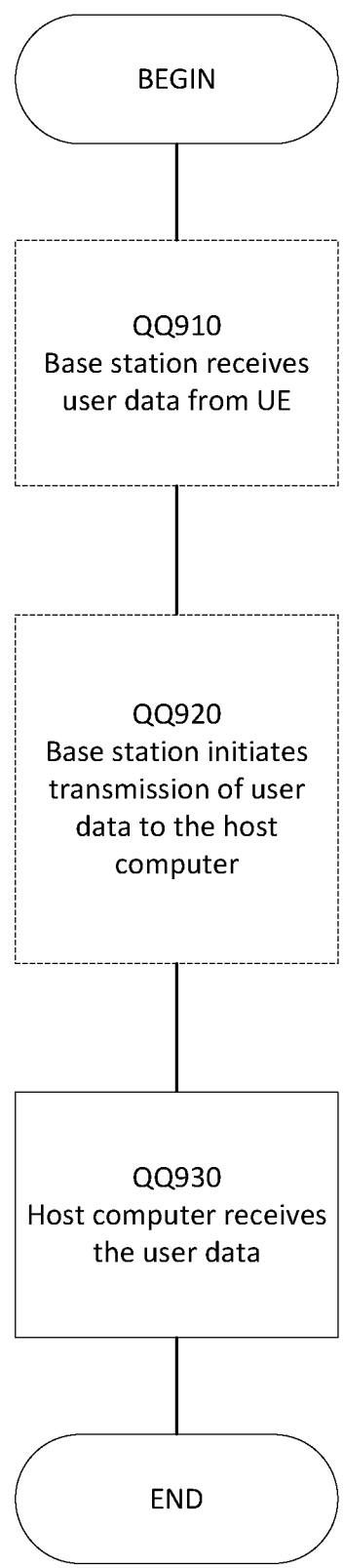
FIG. 20 is a flow diagram of a method of a host computer receiving user data from a UE via a base station.

FIG. 20 is a flowchart illustrating a method implemented in a communication system, in accordance with one embodiment. The communication system includes a host computer, a base station and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein. As used herein, the term "configured to" means set up, organized, adapted, or arranged to operate in a particular way; the term is synonymous with "designed to."

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following examples provide further assistance in describing certain embodiments disclosed herein.

Group A Examples

Example 1. A method performed by a wireless device configured for cross-carrier scheduling in a wireless communication network, the method comprising: receiving a Medium Access Control (MAC) Control Element (CE) message from the network, the MAC CE including at least a serving cell ID field, a Transmission Configuration Indication (TCI) state ID field, and a Control Resource Set (CORESET) ID field; determining, from a serving cell ID field of the MAC CE, whether the MAC CE message is associated with a scheduling serving cell; if the MAC CE message is not associated with a scheduling serving cell, using a TCI state indicated via the TCI state ID field in the MAC CE message as a reference TCI state for the non-scheduling serving cell; and if the MAC CE message is associated with a scheduling serving cell, using a TCI state indicated via the TCI state ID field in the MAC CE message to determine the TCI state applicable to the Control Resource Set of the scheduling serving cell identified by the CORESET ID field in the MAC CE message.

Example 2. The method of example 1 wherein the MAC CE message corresponds to "TCI state indication for UE-specific PDCCH MAC CE."

Example 3. The method of example 1 wherein the non-scheduling serving cell has more than one bandwidth part (BWP), and wherein the reference TCI state is applied for an active BWP.

Example 4. The method of example 1 wherein the non-scheduling serving cell has more than one bandwidth part (BWP), and wherein the reference TCI state is applied for all BWPs.

Example 5. The method of example 1 wherein the non-scheduling serving cell has more than one bandwidth part (BWP), and wherein the reference TCI state is applied for one or more BWPs configured by higher layers.

Example 6. The method of example 1 wherein the reference TCI state is the TCI state assumed for PDSCH reception in the non-scheduling serving cell scheduled by PDCCH in the scheduling serving cell if the scheduled timing offset is smaller than a Delta_Offset threshold.

Example 7. The method of example 6 wherein the scheduled timing offset is the time between the last symbol of the PDCCH and the first symbol of the PDSCH.

Example 8. The method of example 6 wherein the reference TCI state is an active TCI state of the non-scheduling serving cell.

Example 9. The method of example 6 wherein the Delta_Offset threshold is based on a capability indication of the wireless device.

Example 10. The method of example 1 wherein the TCI state applicable to the Control Resource Set of the scheduling serving cell is the TCI state used for PDCCH reception in the scheduling serving cell associated with that Control Resource Set.

Example 11. The method of example 1 wherein the wireless device is configured with a carrier indicator field to monitor PDCCH for a non-scheduling serving cell in a scheduling serving cell.

Example 12. A method performed by a wireless device configured for cross-carrier scheduling in a wireless communication network, the method comprising: receiving a Medium Access Control (MAC) Control Element (CE) message from the network, the MAC CE including at least a serving cell ID field, a Transmission Configuration Indication (TCI) state ID field, and a Control Resource Set (CORESET) ID field; determining, from a serving cell ID field of the MAC CE, whether the MAC CE message is associated with a scheduling serving cell; if the MAC CE message is not associated with a scheduling serving cell, interpreting the CORESET ID filed in the MAC CE as a bandwidth part (BWP) ID and using the TCI state indicated by the TCI state ID field in the MAC CE as a reference TCI state for a BWP indicated by the BWP ID for the non-scheduling serving cell; and if the MAC CE message is associated with a scheduling serving cell, using a TCI state indicated via the TCI state ID field in the MAC CE message to determine the TCI state applicable to the Control Resource Set of the scheduling serving cell identified by the CORESET ID field in the MAC CE message.

Example 13. The method of example 12 wherein the MAC CE message corresponds to "TCI state indication for UE-specific PDCCH MAC CE."

Example 14. The method of example 12 wherein the reference TCI state is the TCI state assumed for PDSCH reception in the non-scheduling serving cell scheduled by PDCCH in the scheduling serving cell if the scheduled timing offset is smaller than a Delta_Offset threshold.

Example 15. The method of example 14 wherein the scheduled timing offset is the time between the last symbol of the PDCCH and the first symbol of the PDSCH.

Example 16. The method of example 14 wherein the reference TCI state is an active TCI state for the BWP for the non-scheduling serving cell.

Example 17. The method of example 14 wherein the Delta_Offset threshold is based on a capability indication of the wireless device.

Example 18. The method of example 12 wherein the TCI state applicable to the Control Resource Set of the scheduling serving cell is the TCI state used for PDCCH reception in the scheduling serving cell associated with that Control Resource Set.

Example 19. The method of example 12 wherein the wireless device is configured with a carrier indicator field to monitor PDCCH for a non-scheduling serving cell in a scheduling serving cell.

Example AA. The method of any of the previous examples, further comprising: providing user data; and forwarding the user data to a host computer via the transmission to the base station.

OTHER EXAMPLES

Example 24. A method performed by a base station . . . .

Example BB. The method of any of the previous examples, further comprising: obtaining user data; and forwarding the user data to a host computer or a wireless device.

Example C1. A wireless device configured to perform any of the steps of any of the Group A examples.

Example C2. A wireless device comprising: processing circuitry configured to perform any of the steps of any of the Group A examples; and power supply circuitry configured to supply power to the wireless device.

Example C3. A wireless device comprising: processing circuitry and memory, the memory containing instructions executable by the processing circuitry whereby the wireless device is configured to perform any of the steps of any of the Group A examples.

Example C4. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A examples; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example C5. A computer program comprising instructions which, when executed by at least one processor of a wireless device, causes the wireless device to carry out the steps of any of the Group A examples.

Example C6. A carrier containing the computer program of example C5, wherein the carrier is one of an electronic signal, optical signal, radio signal, or computer readable storage medium.

Example C7. A base station configured to perform any of the steps of any of the Group B examples.

Example C8. A base station comprising: processing circuitry configured to perform any of the steps of any of the Group B examples; power supply circuitry configured to supply power to the wireless device.

Example C9. A base station comprising: processing circuitry and memory, the memory containing instructions executable by the processing circuitry whereby the base station is configured to perform any of the steps of any of the Group B examples.

Example C10. A computer program comprising instructions which, when executed by at least one processor of a base station, causes the base station to carry out the steps of any of the Group B examples.

Example C11. A carrier containing the computer program of example C10, wherein the carrier is one of an electronic signal, optical signal, radio signal, or computer readable storage medium.

Example D1. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B examples.

Example D2. The communication system of the pervious example further including the base station.

Example D3. The communication system of the previous 2 examples, further including the UE, wherein the UE is configured to communicate with the base station.

Example D4. The communication system of the previous 3 examples, wherein: the processing circuitry of the host computer is configured to execute a host application, thereby providing the user data; and the UE comprises processing circuitry configured to execute a client application associated with the host application.

Example D5. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B examples.

Example D6. The method of the previous example, further comprising, at the base station, transmitting the user data.

Example D7. The method of the previous 2 examples, wherein the user data is provided at the host computer by executing a host application, the method further comprising, at the UE, executing a client application associated with the host application.

Example D8. A user equipment (UE) configured to communicate with a base station, the UE comprising a radio interface and processing circuitry configured to perform any of the previous 3 examples.

Example D9. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A examples.

Example D10. The communication system of the previous example, wherein the cellular network further includes a base station configured to communicate with the UE.

Example D11. The communication system of the previous 2 examples, wherein: the processing circuitry of the host computer is configured to execute a host application, thereby providing the user data; and the UE's processing circuitry is configured to execute a client application associated with the host application.

Example D12. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A examples.

Example D13. The method of the previous example, further comprising at the UE, receiving the user data from the base station.

Example D14. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A examples.

Example D15. The communication system of the previous example, further including the UE.

Example D16. The communication system of the previous 2 examples, further including the base station, wherein the base station comprises a radio interface configured to communicate with the UE and a communication interface configured to forward to the host computer the user data carried by a transmission from the UE to the base station.

Example D17. The communication system of the previous 3 examples, wherein: the processing circuitry of the host computer is configured to execute a host application; and the UE's processing circuitry is configured to execute a client application associated with the host application, thereby providing the user data.

Example D18. The communication system of the previous 4 examples, wherein: the processing circuitry of the host computer is configured to execute a host application, thereby providing request data; and the UE's processing circuitry is configured to execute a client application associated with the host application, thereby providing the user data in response to the request data.

Example D19. A method implemented in a communication system including a host computer, a base station and a user equipment (UE), the method comprising: at the host computer, receiving user data transmitted to the base station from the UE, wherein the UE performs any of the steps of any of the Group A examples.

Example D20. The method of the previous example, further comprising, at the UE, providing the user data to the base station.

Example D21. The method of the previous 2 examples, further comprising: at the UE, executing a client application, thereby providing the user data to be transmitted; and at the host computer, executing a host application associated with the client application.

Example D22. The method of the previous 3 examples, further comprising: at the UE, executing a client application; and at the UE, receiving input data to the client application, the input data being provided at the host computer by executing a host application associated with the client application, wherein the user data to be transmitted is provided by the client application in response to the input data.

Example D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B examples.

Example D24. The communication system of the previous example further including the base station.

Example D25. The communication system of the previous 2 examples, further including the UE, wherein the UE is configured to communicate with the base station.

Example D26. The communication system of the previous 3 examples, wherein: the processing circuitry of the host computer is configured to execute a host application; the UE is configured to execute a client application associated with the host application, thereby providing the user data to be received by the host computer.

Example D27. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A examples.

Example D28. The method of the previous example, further comprising at the base station, receiving the user data from the UE.

Example D29. The method of the previous 2 examples, further comprising at the base station, initiating a transmission of the received user data to the host computer.

The invention claimed is:

1. A method performed by a wireless device configured for cross-carrier scheduling in a wireless communication network; the method comprising the wireless device:
   signaling, to the network, an indication that the wireless device is capable of using a reference Transmission Configuration Indication (TCI) state for a cross-carrier scheduled Physical Downlink Shared Channel (PDSCH) reception on a second serving cell, with a scheduling offset from a Physical Downlink Control Channel (PDCCH) reception from a first serving cell that scheduled the PDSCH, that is less than a predetermined delay; and
   receiving, in response to signaling the reference TCI state capability and from the network, an indication of a TCI state to use as the reference TCI state.

2. The method of claim 1, wherein the first serving cell is a scheduling serving cell and the second serving cell is a non-scheduling serving cell.

3. The method of claim 1, wherein the receiving the indication of the TCI state to use as the reference TCI state comprises:
   receiving a Medium Access Control (MAC) Control Element (CE) message from the network; the MAC CE including at least a serving cell ID field, a TCI State ID field, and a Control Resource Set (CORESET) ID field; and
   determining, from the serving cell ID field of the MAC CE, whether the MAC CE message is associated with a scheduling serving cell.

4. The method of claim 3, wherein the receiving the indication of the TCI state to use as the reference TCI state comprises using, in response to the MAC CE message not being associated with a scheduling serving cell, a TCI state indicated via the TCI State ID field in the MAC CE message as a reference TCI state for the non-scheduling serving cell.

5. The method of claim 3, wherein the receiving the indication of the TCI state to use as the reference TCI state comprises, in response to the MAC CE message not being associated with a scheduling serving cell:
   interpreting the CORESET ID field in the MAC CE as a bandwidth part (BWP) ID; and
   using the TCI state indicated by the TCI State ID field in the MAC CE as a reference TCI state for a BWP indicated by the BWP ID for the non-scheduling serving cell.

6. The method of claim 3, wherein the receiving the indication of the TCI state to use as the reference TCI state comprises, in response to the MAC CE message being associated with a scheduling serving cell using a TCI state indicated via the TCI State ID field in the MAC CE message to determine the TCI state applicable to the CORESET of the scheduling serving cell identified by the CORESET ID field in the MAC CE message.

7. The method of claim 3, wherein the MAC CE message corresponds to a TCI state indication for User Equipment-specific PDCCH MAC CE.

8. A method performed by a base station operative in a wireless communication network; the method comprising the base station:
   receiving, from a wireless device, an indication that the wireless device is capable of using a reference Transmission Configuration Indication (TCI) state for a cross-carrier scheduled Physical Downlink Shared Channel (PDSCH) reception from a second serving cell, with a scheduling offset from a Physical Downlink Control Channel (PDCCH) reception from a first serving cell that is less than a predetermined delay; and
   sending, in response to receiving the reference TCI state capability and to the wireless device, an indication of a TCI state to use as the reference TCI state.

9. The method of claim 8, wherein the first serving cell is a scheduling serving cell and the second serving cell is a non-scheduling serving cell.

10. The method of claim 8, wherein the sending the indication of the TCI state to use as the reference TCI state comprises:
    sending a Medium Access Control (MAC) Control Element (CE) message to the wireless device; the MAC CE including at least a serving cell ID field, a TCI State ID field, and a Control Resource Set (CORESET) ID field; and
    wherein the serving cell ID field of the MAC CE enables the wireless device to determine whether the MAC CE message is associated with a scheduling serving cell.

11. The method of claim 10:
    wherein the MAC CE message is not associated with a scheduling serving cell; and
    wherein the TCI state indicated via the TCI State ID field in the MAC CE message corresponds to a reference TCI state for the non-scheduling serving cell.

12. The method of claim 10,
    wherein the MAC CE message is not associated with a scheduling serving cell;
    wherein the CORESET ID field in the MAC CE corresponds to a bandwidth part (BWP) ID; and
    wherein the TCI state indicated by the TCI State ID field in the MAC CE corresponds to a reference TCI state for a BWP indicated by the BWP ID for the non-scheduling serving cell.

13. The method of claim 10, wherein the MAC CE message corresponds to a TCI state indication for User Equipment-specific PDCCH MAC CE.

14. A user equipment (UE) configured for cross-carrier scheduling in a wireless communication network; the UE comprising:
- processing circuitry;
- memory containing instructions executable by the processing circuitry whereby the UE is operative to:
  - signal, to the network, an indication that the wireless device is capable of using a reference Transmission Configuration Indication (TCI) state for a cross-carrier scheduled Physical Downlink Shared Channel (PDSCH) reception on a second serving cell, with a scheduling offset from a Physical Downlink Control Channel (PDCCH) reception from a first serving cell that scheduled the PDSCH, that is less than a predetermined delay; and
  - receive, in response to signaling the reference TCI state capability and from the network, an indication of a TCI state to use as the reference TCI state.

15. A base station configured to be operative in a wireless communication network;
the base station comprising:
- processing circuitry;
- memory containing instructions executable by the processing circuitry whereby the base station is operative to:
  - receive, from a wireless device, an indication that the wireless device is capable of using a reference Transmission Configuration Indication (TCI) state for a cross-carrier scheduled Physical Downlink Shared Channel (PDSCH) reception from a second serving cell, with a scheduling offset from a Physical Downlink Control Channel (PDCCH) reception from a first serving cell that is less than a predetermined delay; and
  - send, in response to receiving the reference TCI state capability and to the wireless device, an indication of a TCI state to use as the reference TCI state.

* * * * *